(12) United States Patent
Astvatsaturov et al.

(10) Patent No.: US 12,556,826 B2
(45) Date of Patent: Feb. 17, 2026

(54) SELECTIVE USE OF ILLUMINATION COLOR IN SCANNING AND INDUSTRIAL SCANNING APPLICATIONS

(71) Applicant: ZEBRA TECHNOLOGIES CORPORATION, Lincolnshire, IL (US)

(72) Inventors: Yuri Astvatsaturov, Lake Forest, IL (US); Darran Michael Handshaw, Sound Beach, NY (US); Edward Barkan, Miller Place, NY (US); Matthew Lawrence Horner, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 283 days.

(21) Appl. No.: 17/877,677

(22) Filed: Jul. 29, 2022

(65) Prior Publication Data
US 2024/0040264 A1    Feb. 1, 2024

(51) Int. Cl.
| | |
|---|---|
| *G06K 7/10* | (2006.01) |
| *G06K 7/14* | (2006.01) |
| *G06V 10/141* | (2022.01) |
| *G06V 10/70* | (2022.01) |
| *H04N 23/56* | (2023.01) |
| *H04N 23/74* | (2023.01) |
| *H04N 23/84* | (2023.01) |

(52) U.S. Cl.
CPC ........... *H04N 23/74* (2023.01); *G06K 7/1413* (2013.01); *G06V 10/141* (2022.01); *G06V 10/70* (2022.01); *H04N 23/56* (2023.01); *H04N 23/84* (2023.01); *G06K 2007/10524* (2013.01)

(58) Field of Classification Search
CPC ........ H04N 23/74; H04N 23/56; H04N 23/84; H04N 23/11; H04N 13/239; H04N 25/134; H04N 13/207; H04N 23/51; H04N 23/741; H04N 23/71; H04N 23/73; H04N 23/80
USPC .................... 235/462.01, 462.09, 462.1, 454
See application file for complete search history.

(56) References Cited

U.S. PATENT DOCUMENTS

| | | | |
|---|---|---|---|
| 8,960,551 B2 * | 2/2015 | Pang .................... | G06K 7/1408 235/462.31 |
| 2013/0299581 A1 * | 11/2013 | Handshaw ............... | G06K 7/12 235/440 |
| 2018/0181786 A1 * | 6/2018 | Gao ...................... | G06K 7/1413 |
| 2020/0404151 A1 * | 12/2020 | Talbert ................. | A61B 1/0653 |

(Continued)

*Primary Examiner* — Daniel St Cyr

(57) ABSTRACT

Imaging devices, systems, and methods for imaging or scanning objects using composite color light are described herein. An example device includes: a plurality of light sources, each configured to emit light in a different wavelength range; an imaging assembly having an imaging sensor operable to receive light from a field of view (FOV), the imaging sensor configured to capture image data during a frame having an exposure duration and a non-exposure duration; and a microprocessor and computer-readable media storing machine readable instructions that, when executed, cause: a first subset of the plurality of light sources to emit a first light during a first illumination duration that at least partially overlaps with the exposure duration of the frame; and a second subset of the plurality of light sources to emit a second light during a second illumination duration that at least partially overlaps with the non-exposure duration of the frame.

28 Claims, 18 Drawing Sheets

(56) References Cited

U.S. PATENT DOCUMENTS

2021/0112647 A1* 4/2021 Coleman ................ H05B 47/16
2022/0232138 A1* 7/2022 Gao ................... H04N 1/00811

* cited by examiner

SELECTIVE USE OF ILLUMINATION COLOR IN SCANNING AND INDUSTRIAL SCANNING APPLICATIONS

BACKGROUND

Barcode reading systems have long been used to capture barcode data, which is then used to look up the price of the item read. Barcode reading is traditionally performed with monochromatic imaging. In other words, both the camera and the illumination source operate within a narrow bandwidth of the electromagnetic spectrum. LEDs are typically used as the illumination source to achieve this narrow bandwidth. Barcode reading with monochrome imaging is cost effective and is traditionally performed in the red region of the visible electromagnetic spectrum because of traditional barcode designs and for improved performance with infrared illumination for use in security fields as well as decoding digital watermarks. Further, reading system performance is generally better with monochrome imaging. For color sensors, the Bayer pattern can reduce the resolution on the barcode and subsequently limit the decode ranges.

Digital or camera based barcode imagers may be further used for machine vision purposes, such as for item and/or characteristic recognition or measurement purposes. However, item recognition is typically performed with a wider array of colors, depending on the task at hand. In other words, both the camera and the illumination source operate within a broad region of the visible spectrum.

However, while red light is often preferable over white light for barcode reading purposes, red light can cause problems such as illness or eye strain and, as such, white light may be preferable from a human perspective. Further, an imaging and/or vision capture system that utilizes a wider region of the visible spectrum faces reduced performance using solely red light. As such, a method for maintaining the performance of a reading system that uses red light while offering the benefits of a system that uses white light is desired.

SUMMARY

In an embodiment, a device for imaging-based indicia decoding and/or machine vision applications is provided. The device includes: (a) a plurality of light sources, each light source of the plurality of light sources configured to emit light in a different wavelength range; (b) an imaging assembly having an imaging sensor operable to receive light from a field of view (FOV), the imaging sensor configured to capture image data during a frame having an exposure duration and a non-exposure duration; and (c) a microprocessor and computer-readable media storing machine readable instructions that, when executed, cause: (i) a first subset of the plurality of light sources to emit a first light during a first illumination duration that at least partially overlaps with the exposure duration of the frame; and (ii) a second subset of the plurality of light sources to emit a second light during a second illumination duration that at least partially overlaps with the non-exposure duration of the frame.

In a variation of the embodiment, the sensor is a monochrome sensor, and the second light has a substantially white color.

In another variation of the embodiment, the machine readable instructions, when executed, further cause the device to: decode, after receiving the first light, at least one barcode of the object.

In yet another variation of the embodiment, the first subset of the plurality of light sources emits the first light with wavelengths in the range of 600-720 nm, and the second subset of the plurality of light sources emits the second light including light with wavelengths in the range of 450-495 nm and light with wavelengths in the range of 520-560 nm.

In still yet another variation of the embodiment, the first subset of the plurality of light sources emits the first light with wavelengths in the range of 600-720 nm, and the second subset of the plurality of light sources emits the second light with wavelengths in the range of 490-520 nm.

In another variation of the embodiment, a first brightness of the first subset of the plurality of light sources is approximately equal to a second brightness of the second subset of the plurality of light sources when a first length of the first illumination duration is approximately equal to a second length of the second illumination duration.

In yet another variation of the embodiment, a first brightness of the first subset of the plurality of light sources is proportionally less than a second brightness of the second subset of the plurality of light sources when a first length of the first illumination duration is longer than a second length of the second illumination duration.

In still yet another variation of the embodiment, the machine readable instructions, when executed, further cause the microprocessor to: execute (i) and (ii) in response to detecting a presence of a digital watermark in the image data.

In a further variation of the embodiment, the sensor is a color sensor disposed to receive a reflection of the first light from the object and the machine readable instructions, when executed, further cause the microprocessor to: prior to performing (i) and (ii), capture at least one image with at least one illumination light source of the plurality of light sources; identify an image characteristic associated with an object in the at least one image; and based on the image characteristic, select at least a first light source of the first subset of the plurality of light sources and a second light source of the second subset of the plurality of light sources.

In another variation of the embodiment, the at least one image includes a first image of the at least one image captured with a first illumination light source and a second image of the at least one image captured with a second illumination light source.

In yet another variation of the embodiment, the image data is captured during or after performing (i) and (ii) a first time, and the machine readable instructions, when executed, further cause the microprocessor to: subsequently to capturing the image data, analyze the image data to generate an analysis of the image data; capture a second image with the at least one illumination light source of the plurality of light sources; subsequently to capturing the second image, perform (i) and (ii) a second time based on the analysis of the image data; identify a second image characteristic associated with a second object in the second image; and based on the second image characteristic, select at least an updated first light source of the first subset of the plurality of light sources and at least an updated second light source of the second subset of the plurality of light sources.

In a further variation of the embodiment, the performing (i) and (ii) the first time is in a first ambient light, and the performing (i) and (ii) the second time is in a second ambient light.

In another further variation of the embodiment, the performing (i) and (ii) the first time is for a first job task of a set of job tasks, the performing (i) and (ii) the second time is for a second job task of the set of job tasks, and the machine readable instructions, when executed, further cause the microprocessor to: determine, based on at least the first light source and the updated first light source, a job task sequence for performing the set of job tasks.

In yet another further variation of the embodiment, the performing (i) and (ii) the second time occurs after the microprocessor determines that at least one of: (a) a change in ambient light has occurred, (b) a predetermined duration of time has passed, (c) a shift change has occurred, or (d) a predetermined number of jobs have been completed.

In a further variation of the embodiment, the microprocessor determines, using a trained machine learning algorithm, that at least one of: (a) a change in ambient light has occurred, (b) a predetermined duration of time has passed, (c) a shift change has occurred, (d) a predetermined number of jobs have been completed, (e) a production line speed has changed, (f) an orientation of the object has changed, or (g) a subset of a color of the object has changed.

In a still further variation of the embodiment, selecting at least the first light source and the second light source includes selecting a third light source of the second subset of the plurality of light sources; the plurality of light sources includes a red light source that emits light with wavelengths of 600-720 nm, a green light source that emits light with wavelengths of 520-560 nm, and a blue light source that emits light with wavelengths of 450-495 nm; the first light source is the red light source; the second light source is the green light source; and the third light source is the blue light source.

In another further variation of the embodiment, the second illumination duration is greater than the first illumination duration.

In yet another further variation of the embodiment, at least one light source of the plurality of light sources has a brightness value below a maximum brightness value for the at least one light source.

In still yet another further variation of this embodiment, the first illumination duration overlaps a majority of the exposure duration and the second illumination duration overlaps a majority of the non-exposure duration.

In another embodiment, a system for imaging-based indicia decoding and/or machine vision applications is provided. The system includes: (a) a plurality of light sources, each light source of the plurality of light sources configured to emit light in a different wavelength range; and (b) an imaging device including: (1) an imaging assembly having an imaging sensor operable to receive light from a field of view (FOV), the imaging sensor configured to capture image data during a frame having an exposure duration and a non-exposure duration; and (2) a microprocessor and computer-readable media storing machine readable instructions that, when executed, cause: (i) a first subset of the plurality of light sources to emit a first light during a first illumination duration that at least partially overlaps with the exposure duration of the frame; and (ii) a second subset of the plurality of light sources to emit a second light during a second illumination duration that at least partially overlaps with the non-exposure duration of the frame.

In yet another embodiment, a method for decoding imaging-based indicia and/or performing machine vision applications is provided. The method includes: (i) capturing, by an imaging sensor operable to receive light from a field of view (FOV), image data during a frame having an exposure duration and a non-exposure duration; (ii) emitting, from a first subset of a plurality of light sources, a first light during a first illumination duration that at least partially overlaps with the exposure duration of the frame, wherein each light source of the plurality of light sources is configured to emit light in a different wavelength range; and (iii) emitting, from a second subset of the plurality of light sources, a second light during a second illumination duration that at least partially overlaps with the non-exposure duration of the frame.

In yet another embodiment, the present invention is a device for imaging-based indicia decoding and/or machine vision applications, the device comprising: a plurality of light sources, each light source of the plurality of light sources configured to emit light in a different wavelength range; a first imaging assembly having a first imaging sensor operable to receive light from a first field of view (FOV), the first imaging sensor configured to capture first-imager image data during a first-imager frame having a first-imager exposure duration and a first-imager non-exposure duration; a second imaging assembly having a second imaging sensor operable to receive light from a second FOV, the second imaging sensor configured to capture second-imager image data during a second-imager frame having a second-imager exposure duration and a second-imager non-exposure duration; and a microprocessor and computer-readable media storing machine readable instructions that, when executed, cause: (i) the first imaging assembly to capture the first-imager image data; (ii) the second imaging assembly to capture the second-imager image data; (iii) a first subset of the plurality of light sources to emit a first light during a first illumination duration that at least partially overlaps with the first-imager exposure duration of the first-imager frame and further at least partially overlaps with the second-imager non-exposure duration of the second-imager frame; and (iv) a second subset of the plurality of light sources to emit a second light during a second illumination duration that at least partially overlaps with the first-imager non-exposure duration of the first-imager frame and further at least partially overlaps with the second-imager exposure duration of the second-imager frame, wherein the first-imager frame and the second-imager frame at least partially overlap in time.

In yet another embodiment, the present invention is a method for decoding imaging-based indicia and/or performing machine vision applications, the method comprising: (i) capturing, by a first imaging sensor operable to receive light from a first field of view (FOV), first-imager image data during a first-imager frame having a first-imager exposure duration and a first-imager non-exposure duration; (ii) capturing, by a second imaging sensor operable to receive light from a second FOV, second-imager image data during a second-imager frame having a second-imager exposure duration and a second-imager non-exposure duration; (iii) emitting, from a first subset of a plurality of light sources, a first light during a first illumination duration that at least partially overlaps with the first-imager exposure duration of the first-imager frame and further at least partially overlaps with the second-imager non-exposure duration of the second-imager frame, wherein each light source of the plurality of light sources is configured to emit light in a different wavelength range; and (iv) emitting, from a second subset of the plurality of light sources, a second light during a second illumination duration that at least partially overlaps with the first-imager non-exposure duration of the first-imager frame and further at least partially overlaps with the second-imager exposure duration of the second-imager frame, wherein the first-imager frame and the second-imager frame at least partially overlap in time.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
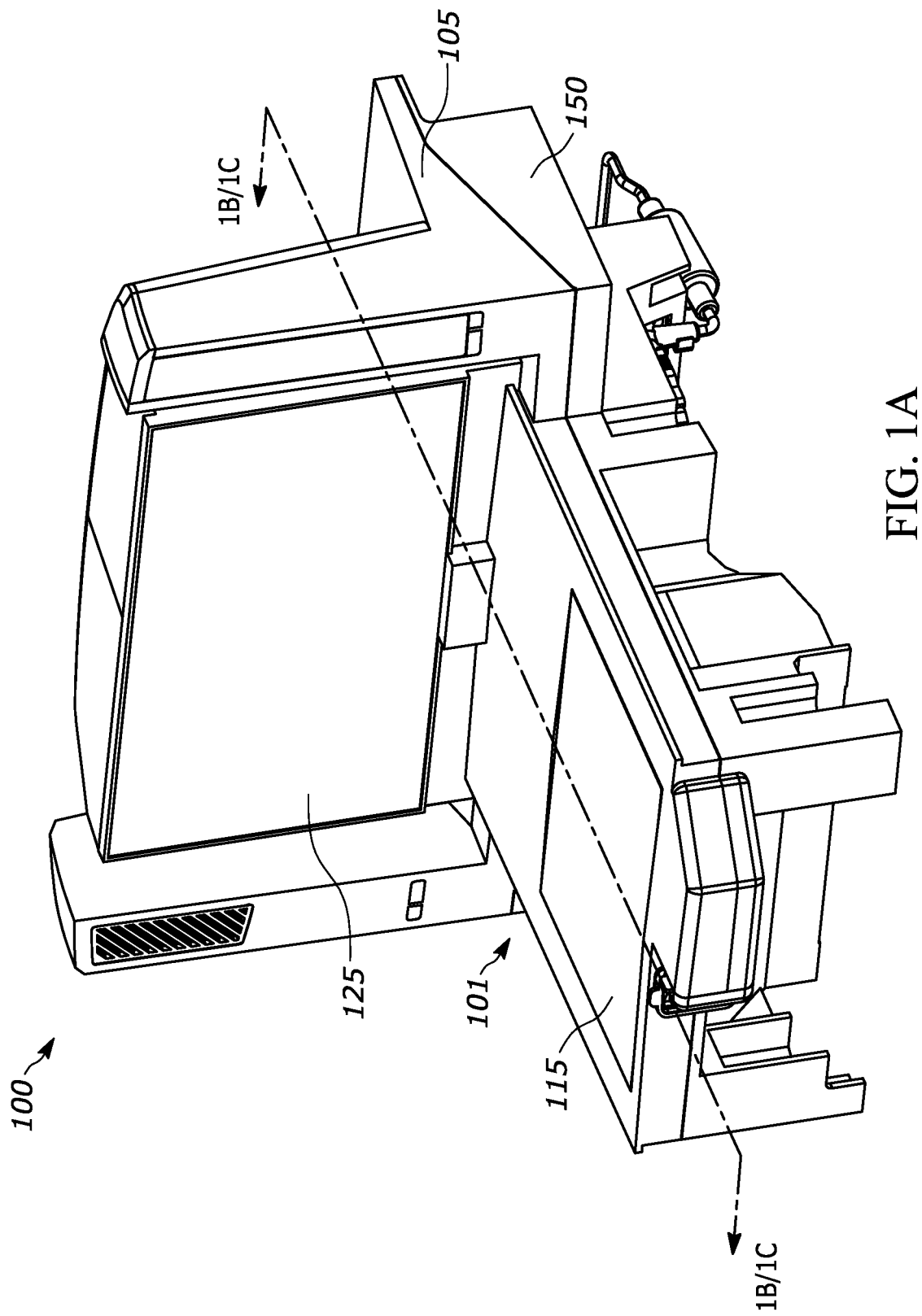
FIG. 1A illustrates a perspective view of a first example bioptic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Traditional barcode readers, industrial imagers, and other such imaging devices use red light for performing imaging tasks. However, while red light has better applications in security fields, preserving night vision, and in providing contrast in traditional barcode designs, other color lights can be preferable depending on the scenario. For example, red light has had harsh effects on individuals experiencing the light. Notably, red light can make people feel ill or cause PTSD attacks. Industries sensitive to such concerns, such as the healthcare industry, are unable to fully utilize imaging devices that rely on emitting red light.

Moreover, a number of traditional techniques add further problems. For example, using a color sensor to read barcode data or other such indicia data introduces additional problems into the system through the requirement of a Bayer filter to properly process the light. For monochromatic light, the Bayer filter used in the color sensor leads to reduced resolution, as some of the RGB pixels of the Bayer filter do not properly interact with the monochromatic light. Further, using white light for the barcode or indicia decoding leads to increased processing time and additional required resources. Similarly, monochrome sensors cannot properly distinguish the multiple colors in the white light Further, while red light often is preferred for reading traditional barcode designs, imaging devices such as industrial imagers perform additional functions that may be better performed using other colors, such as blue light, green light, cyan light, white light, etc. Traditional techniques for providing the range of potentially useful light require additional light sources and/or sensors, leading to greater bulk, power consumption, etc. Accordingly, there is a need for solutions that solve issues regarding readers that cannot efficiently provide preferable varieties of light.

For example, when the imaging device activates to capture barcode data or image data, a monochromatic sensor may not register a barcode or a digital watermark when receiving white light. However, staggering the emission of red light from the emission of other colors of light and using shutter circuitry in the imaging device to only allow the red light to be registered by a sensor allows for the monochromatic sensor to receive red light while still appearing to be substantially white light to a human observer.

Moreover, staggering the emission of a first color of light from the emission of other colors of light in conjunction with the use of shutter circuitry in an industrial imager allows the imager to rotate through different colors and/or combinations of colors to determine an ideal color light to perform a particular task in imaging an object while still appearing to be the same color throughout to a human observer, such as substantially white or another composite color.

Other benefits may be realized from incorporating a system implementing the instant techniques. For example, the imaging device of the present application may be smaller, cheaper, and/or less energy intensive due to the obviation of a need for multiple light sources while still maintaining equivalent results. Further, the imaging device of the present application may perform the techniques described herein without a human observer registering color flickering due to the speed of the change in a single frame.

Figure 1B:
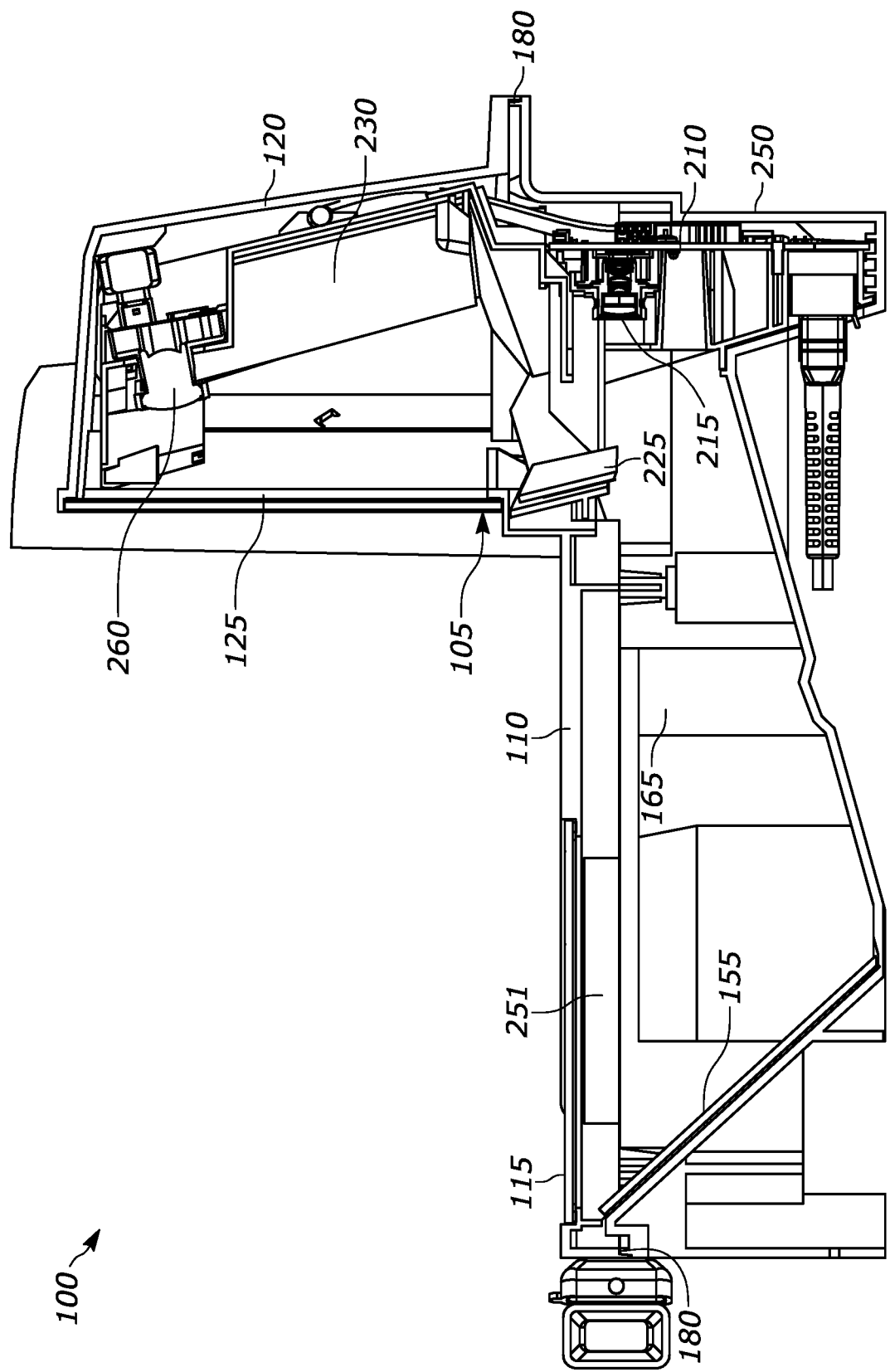
FIG. 1B illustrates a side view of the bioptic barcode reader of FIG. 1A.
Figure 1C:
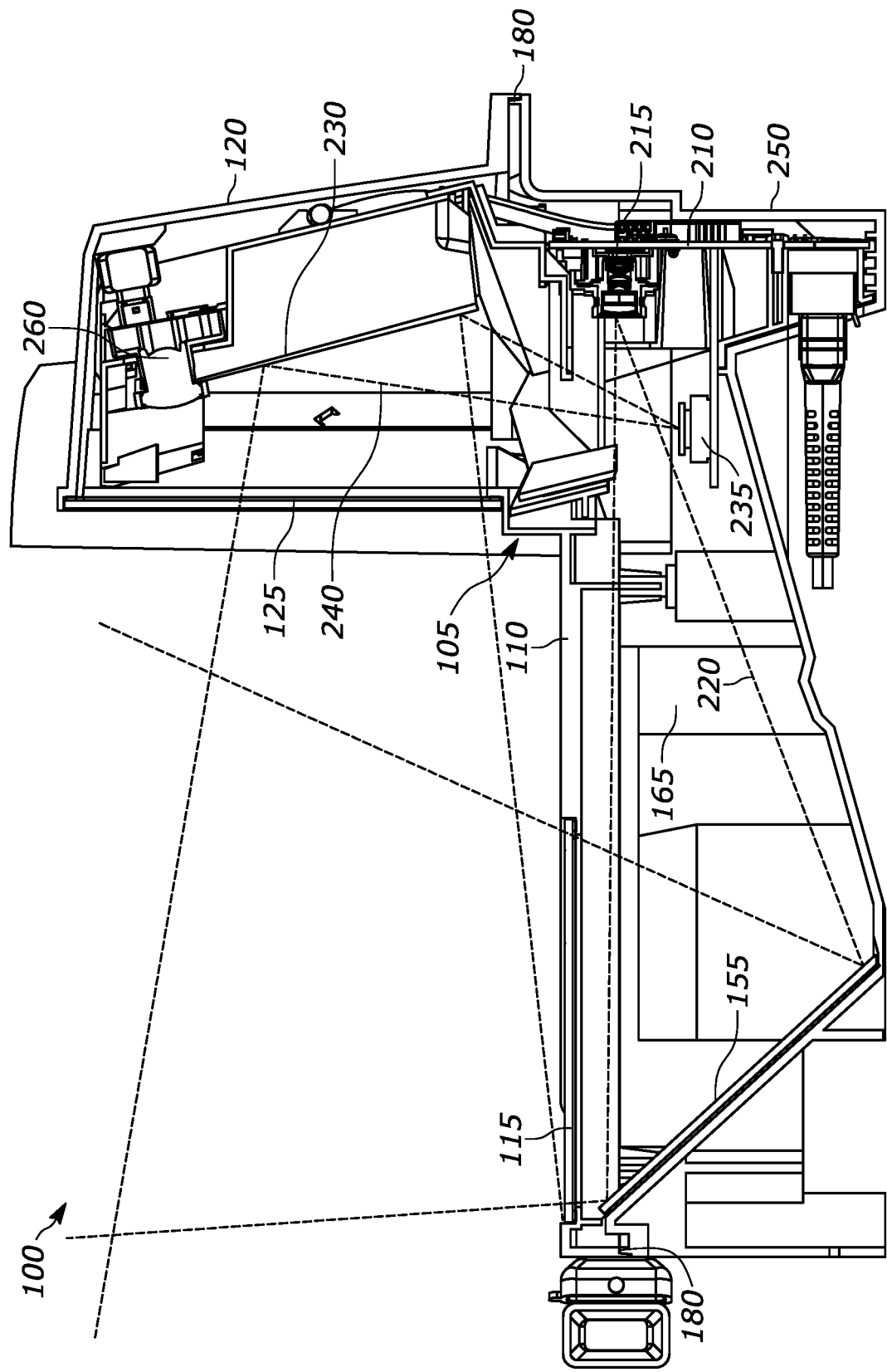
FIG. 1C illustrates the fields-of-view (FOVs) of imaging devices in a side view of the bioptic barcode reader of FIG. 1A.

Referring first to FIGS. 1A-1C, an example bioptic barcode reader 100 is shown that includes a housing assembly 101 with an upper housing 105 and a lower housing 150, which together define an interior region 165 of bioptic barcode reader 100. Lower housing 150 is secured directly to upper housing 105, for example with threaded members, without any intermediate housing portion positioned between upper housing 105 and lower housing 150. A seal 180 can be positioned between upper housing 105 and lower housing 150, which can minimize electrostatic discharge and dust, and liquid from entering interior region 165.

As can be seen in FIG. 1B, bioptic barcode reader 100 can include various optical and electronic components, such as a monochromatic imaging sensor 215, at least one intermediate mirror 225, at least one vertical output mirror 230, and at least one horizontal output mirror 155 positioned in interior region 165. With this arrangement of components, intermediate mirror 225 is a splitter mirror and a field-of-view of imaging sensor 215 is split by intermediate mirror 225 into a first portion and a second portion, with the first portion being directed out of generally horizontal window 115 by horizontal output mirror 155 and the second portion being directed out of generally upright window 125 by vertical output mirror 230. Moreover, the bioptic barcode reader 100 may also include an illumination light source 251, which emits substantially white light towards an object through horizontal window 115. White or substantially white light may refer to light that appears white and/or off-white to a human user or observer. In some implementations, the illumination light source 251 includes a plurality of light sources that collectively make up the illumination light source 251. For example, the illumination light source 251 includes three light sources (e.g., light sources 251A, 251B, and 251C), such as LEDs or components of an LED, that emits light, each of a distinct wavelength at a respective predetermined intensity, such that a combined output of the three light sources causes the output of the illumination light source 251 to provide a white appearance to a user. In further implementations, the illumination light source 251 emits light that includes wavelengths across the entire visible spectrum to appear white. In still further implementations, the illumination light source 251 emits light that includes wavelengths across a majority of the visible spectrum to have an off-white appearance.

In some implementations, the illumination light source 251 emits substantially white light through horizontal window 115 by directly emitting light through generally horizontal window 115 or by reflecting light using at least one horizontal output mirror 155. In other implementations, the illumination light source 251 is additionally or alternatively positioned to emit white light through generally upright window 125, either directly or via optical elements such as at least one vertical output mirror 230.

As shown in the example shown in FIGS. 1B and 1C, intermediate mirror 225 is a concave splitter mirror that directs one part of the second portion to a first vertical output mirror 230 and a second part of the second portion to a second vertical output mirror 230. Alternatively, intermediate mirror 225 could also be a convex splitter mirror that directs the second portion to two vertical output mirrors 230 or intermediate mirror 225 could be a planar splitter mirror that directs the entire second portion to a single vertical output mirror 230. In addition, in some implementations, the bioptic barcode reader 100 has a color imaging sensor 235, where a first field-of-view 220 of monochromatic imaging sensor 215 is directed out of generally horizontal window 115 by horizontal output mirror 155 and a second field-of-view 240 of color imaging sensor 235 is directed out of generally upright window 125 by vertical output mirror 230.

Further, in the example embodiment of FIG. 1C, the monochromatic imaging sensor 215 includes electronic shutter circuitry to control an exposure duration of the monochromatic imaging sensor 215. In particular, the electronic shutter circuitry causes the sensor 215 to register and/or read out light values of pixels of the sensor 215 during the exposure duration and causes the sensor 215 to not register and/or read out light values of the pixels during a non-exposure period. Depending on the implementation, the shutter circuitry is configured to activate after the sensor 215 receives light from one light source, as described below in more detail with regard to FIG. 8. In still further implementations, additional shutter circuitry performing a similar function is included in the color imaging sensor 235 as described above with regard to the monochrome imaging sensor.

Although not required and not shown in FIGS. 1A-1C, bioptic barcode reader 100 can also include additional optical and electronic components, such as a vertical illumination subsystem, a user interface subsystem, a speaker subsystem, an off-platter detection subsystem, etc.

Figure 2:
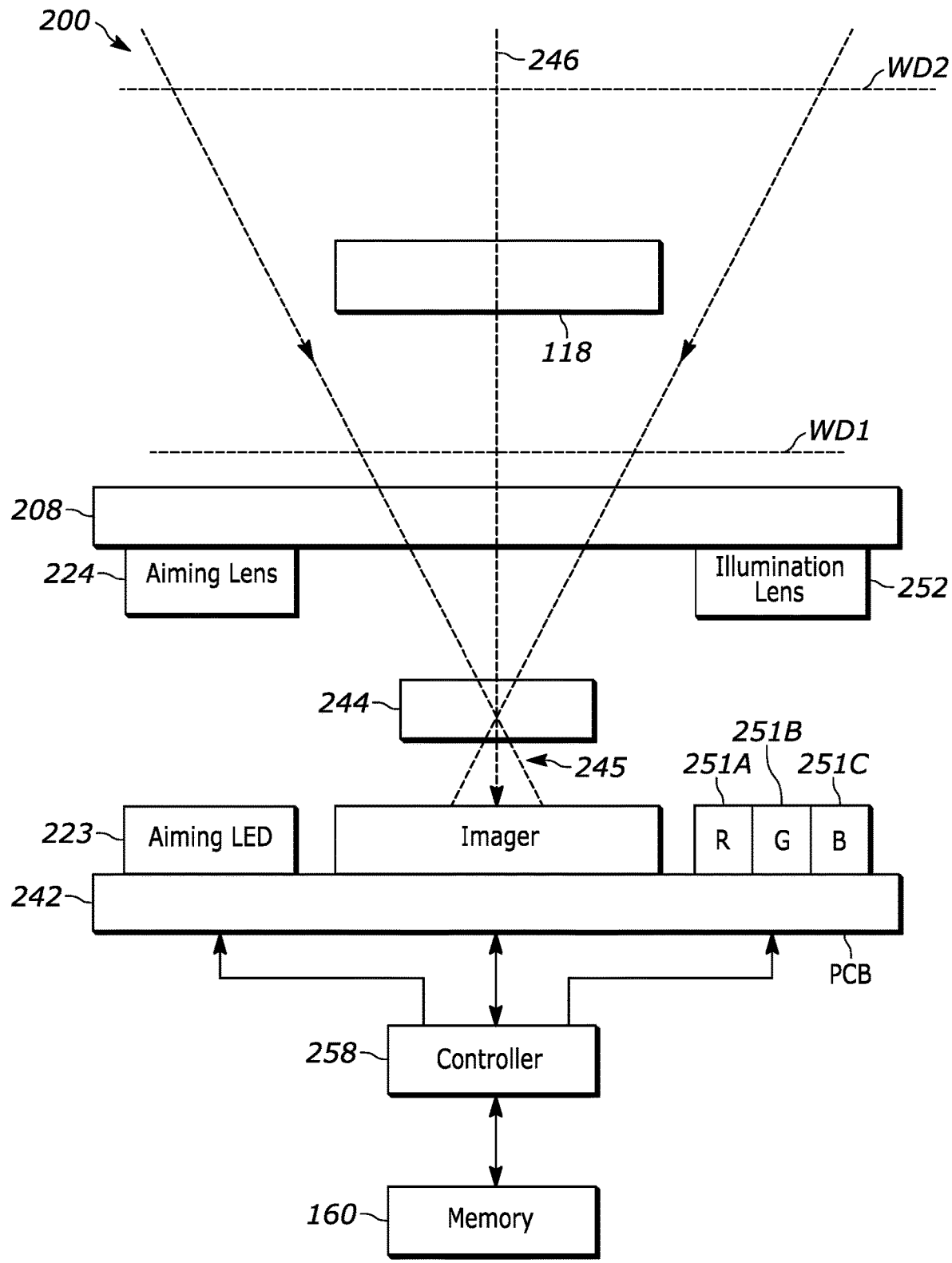
FIG. 2 illustrates a block diagram of an example imaging device such as the example bioptic barcode reader of FIG. 1A.

Referring next to FIG. 2, a block diagram of an example architecture for an imaging device such as bioptic barcode reader 100 is shown. For at least some of the reader embodiments, an imaging assembly 245 includes a light-detecting sensor or imager 241 operatively coupled to, or mounted on, a printed circuit board (PCB) 242 in the imaging device 200 as shown in FIG. 2. In an embodiment, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein.

As discussed in detail above, a monochrome sensor may not operate efficiently and/or properly when receiving color light. As such, the introduction of the techniques described herein allows the use of a monochrome sensor in the imaging device 200 while emitting and receiving white light. Further, the imager 241 may include a color sensor in addition to and/or as an alternative to the monochrome sensor. Depending on the implementation, the monochrome sensor receives a subset of the emitted light (e.g., red light) while the color sensor receives substantially white light. Therefore, because color sensors operate efficiently when receiving color light rather than red light, the introduction of the techniques described herein allows for increased operation efficiency of both the monochrome sensor and the color sensor in the imager 241. The imager 241 may also shutter circuitry as described above. It will be understood that, although imager 241 is depicted in FIG. 2 as a single block, that imager 241 may be multiple sensors spread out in different locations of imaging device 200.

In some implementations, the imager 241 is or includes the monochromatic imaging sensor 215 of FIGS. 1A-1C. In further implementations, the imager 241 additionally or alternatively is or includes the color imaging sensor 235 of FIGS. 1A-1C. The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an embodiment, WD1 is about one-half inch from the window 208, and WD2 is about thirty inches from the window 208.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination sources (e.g., first light source 251A, second light source 251B, and third light source 251C) and illumination lenses, configured to generate a substantially uniform distributed illumination pattern of illumination light on and along the object 118 to be imaged by image capture. Although FIG. 2 illustrates an illumination light source 251 including three illumination sources, each emitting red (251A), green (251B), or blue light (251B), it will be understood that the illumination light source 251 may include more or fewer light sources and/or light sources using different color light. At least part of the scattered and/or reflected return light is derived from the illumination pattern of light on and along the object 118. In some implementations, the illumination source 251 includes a light source that emits substantially white light, such as a white light LED. In further implementations, the illumination source 251 includes a plurality of light sources that collectively emit substantially white light or light that, in combination, appears white to the human eye. For example, the illumination source 251 may include a red LED, a blue LED, and a green LED that emit light in combination to appear white to the human eye.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241.

Further, the imager 241, the illumination source 251, and the aiming source 223 are operatively connected to a controller or programmed microprocessor 258 operative for controlling the operation of these components. A memory 429 is connected and accessible to the controller 258. Preferably, the microprocessor 258 is the same as the one used for processing the captured return light from the illuminated object 118 to obtain data related to the object 118. Though not shown, additional optical elements, such as collimators, lenses, apertures, compartment walls, etc. are provided in the housing. Although FIG. 2 shows the imager 241, the illumination source 251, and the aiming source 223 as being mounted on the same PCB 242, it should be understood that different embodiments of the imaging device 200 may have these components each on a separate PCB, or in different combinations on separate PCBs. For example, in an embodiment of the imaging device 200, the illumination LED source is provided as an off-axis illumination (i.e., has a central illumination axis that is not parallel to the central FOV axis).

In some implementations, the illumination source 251 emits light at different intensities at different times and/or from different portions of the illumination source 251A, 251B, and/or 251C. In some such implementations, the first illumination source 251A emits light at a first intensity the second illumination source 251B and the third illumination source 251C emit light of different colors to first illumination source 251A at a second intensity.

In some implementations, the object 118 is or includes an indicia for decoding, such as a barcode, a QR code, a label, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200. In further implementations, the digital watermark is a Digimarc® watermark. In some further such implementations, the digital watermark can be decoded using a monochrome sensor such as monochrome imaging sensor 215 of FIGS. 1A-1C receiving red light or by a color sensor such as color imaging sensor 235 of FIGS. 1A-1C receiving substantially white light. In implementations in which the watermark is a Digimarc® watermark, the watermark is designed such that pixels in the watermark have contrast with neighboring pixels under red light. In further such implementations, the pixels in the watermark have a maximized contrast with red light, but have a level of contrast with other color light.

Although FIGS. 1A-1C depict an imaging device such as a bioptic barcode reader 100 in the form of a barcode reading platform, it will be understood that further imaging devices may include architecture similar to imaging device 100 and bioptic barcode reader 100. For example, the imaging device may be and/or may include a handheld barcode reader, as described in more detail below with regard to FIGS. 3A-4C.

Figure 3A:
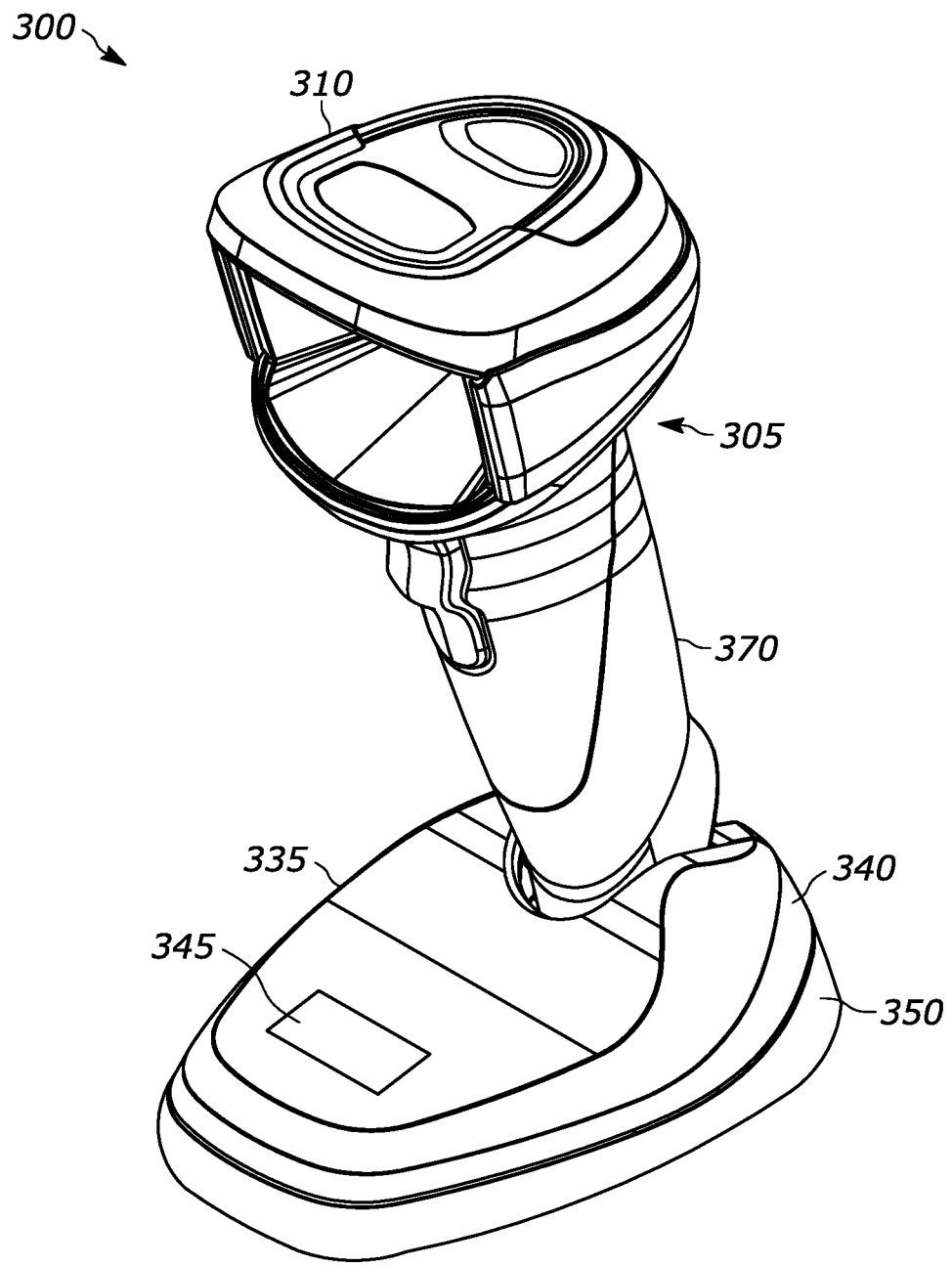
FIG. 3A illustrates a perspective view of a first example handheld barcode reader.
Figure 3B:
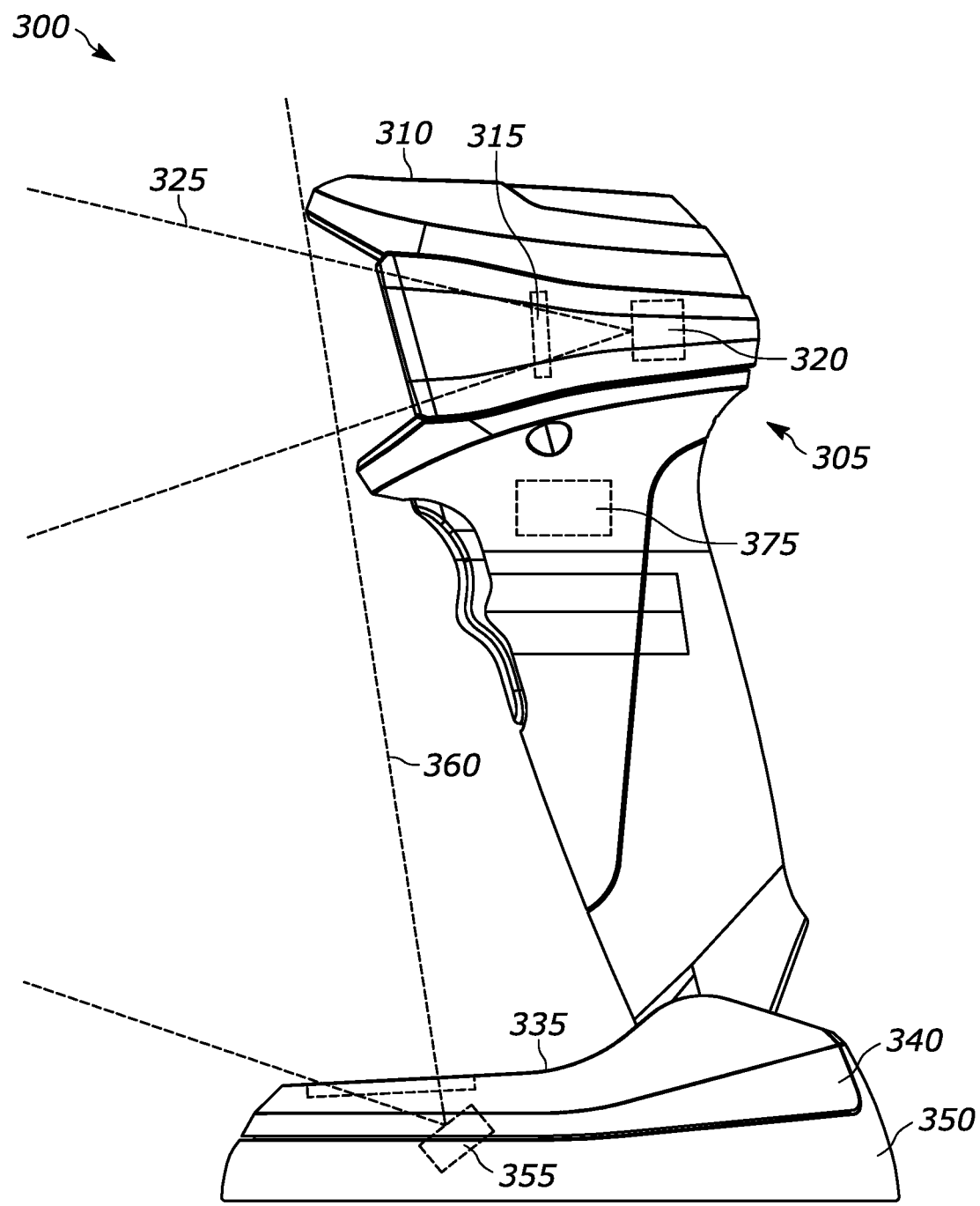
FIG. 3B illustrates a side view of the handheld barcode reader of FIG. 3A.
Figure 3C:
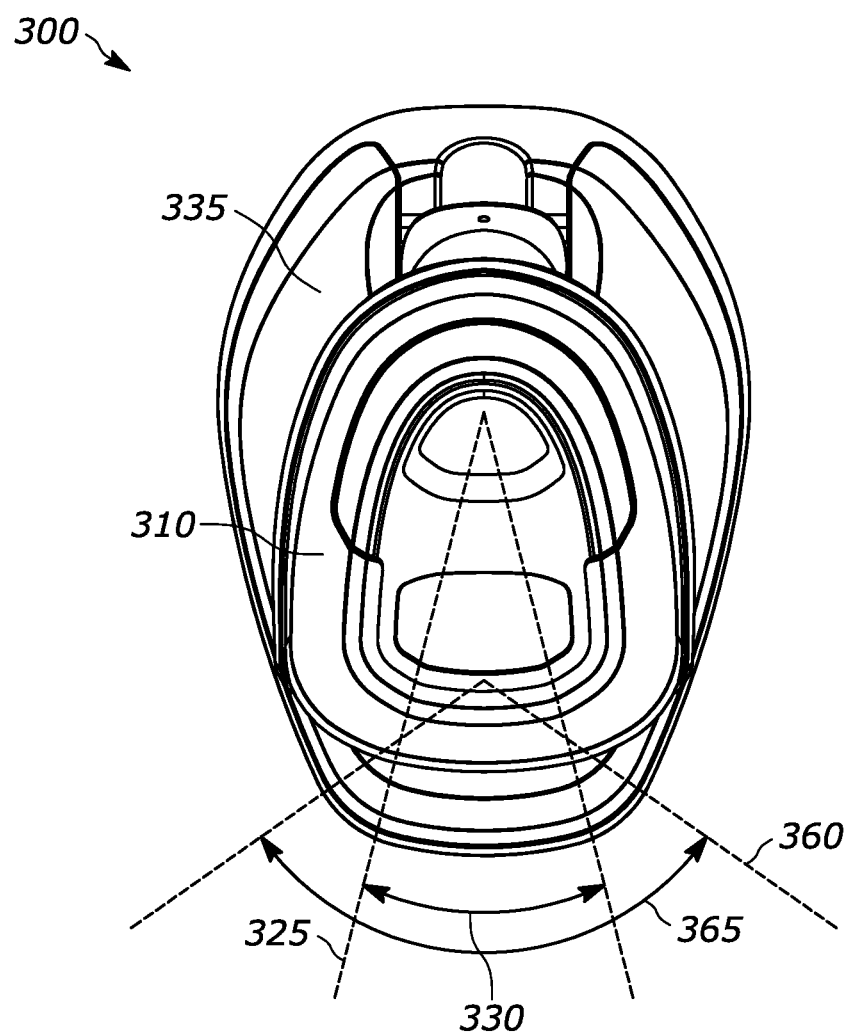
FIG. 3C illustrates a top view of the handheld barcode reader of FIG. 3A.

Referring to FIGS. 3A-3C, a first example handheld barcode reader 300 is illustrated. Handheld barcode reader 300 generally includes a housing 305 having a head portion 310 and a base portion 335. Base portion 335 includes an upper portion 340, a lower portion 350 removably attached to upper portion 340, and a base window 345 formed in upper portion 340. While lower portion 350 is shown as being separable from upper portion 340 in a horizontal direction, the separation between lower portion 350 and upper portion 340 could be vertical or in any other direction appropriate for a particular application. In the particular example shown, housing 305 also has a handle portion 370 positioned between head portion 310 and base portion 335 and configured to be grasped by the hand of a user.

A color imaging sensor 355 is positioned within base portion 335 and has a first field-of-view (FOV) 360 that is directed out of base window 345 in upper portion 340 of base portion 335. Preferably, an area adjacent a front of handle portion 370 (e.g., within 10 mm of the front of handle portion 370 or within a finger's width of the front of handle portion 370) is visible in first FOV 360, which can be used to determine if a user is gripping handle portion and possibly switch handheld barcode reader 300 between a hands-free presentation mode and a handheld reading mode based on color sensor 355 detecting the presence or absence of the hand of the user within first FOV 360. In the example shown, color sensor 355 is configured to capture images to perform functions such as facial recognition, gesture recognition, product identification, scan avoidance, ticket switching, etc.

A barcode reading module 320 including a monochromatic sensor is positioned at least partially in head portion 310 and has a second FOV 325 that is directed through an imaging window 315 in head portion 310 and can at least partially overlap first FOV 360. Further, barcode reading module may include shutter circuitry as described above with regard to FIG. 2.

A controller 375 is also positioned within housing 305 and is in communication with barcode reading module 320 and color sensor 355. Controller 375 is configured to decode process signals from barcode reading module 320 from barcodes that are read by barcode reading module 320 and to receive and process images captured by and received from color sensor 355 for processes that do not include barcode reading, as discussed above. Controller 375 is also configured to synchronize barcode reading module 320 and color sensor 355 so that color sensor 355 does not capture images when barcode reading module 320 is active. Controller 375 can synchronize barcode reading module 320 and color sensor 355 based on images captured by color sensor 355. Alternatively, controller 375 could be configured to synchronize color sensor 355 and barcode reading module 320 to activate simultaneously so that color sensor 355 can use the same illumination as barcode reading module 320.

As best shown in FIG. 3C, in some implementations, first FOV 360 of color sensor 355 has a horizontal viewing angle 365 that is larger than the horizontal viewing angle 330 of second FOV 325 of barcode reading module 320. For example, horizontal viewing angle 365 of first FOV 360 could be between 80 degrees and 120 degrees and is preferably 100 degrees. In addition, horizontal viewing angle 330 of second FOV 325 could be between 40 degrees and 60 degrees. With horizontal viewing angle 365 of first FOV 360 of color sensor 355 being wider than horizontal viewing angle 330 of second FOV 325 of barcode reading module 320, color sensor 355 can be used as a wake-up system and controller 375 can be configured to turn on barcode reading module 320 when an object is detected in first FOV 360 of color sensor 355, before the object reaches second FOV 325 of barcode reading module 320. This allows barcode reading module 320 to be active as the object enters second FOV 325 and allows more time for barcode reading module 320 to read and decode a barcode on the object.

Although the example embodiments of FIGS. 3B-3C depict the barcode reading module 320 including a monochromatic sensor in the head portion 310 and the color sensor in the base portion 335, it will be understood that, in some implementations, the barcode reading module 320 is located in the base portion 335 and the color sensor 355 is located in the head portion 310. In further implementations, both the barcode reading module 320 and the color sensor 355 are located in either the head portion 310 or the base portion 335.

Although FIGS. 3A-3C depict multiple imaging assemblies, it will be understood that, in some implementations, the barcode reader only includes a single imaging assembly with a single imaging sensor.

Figure 4A:
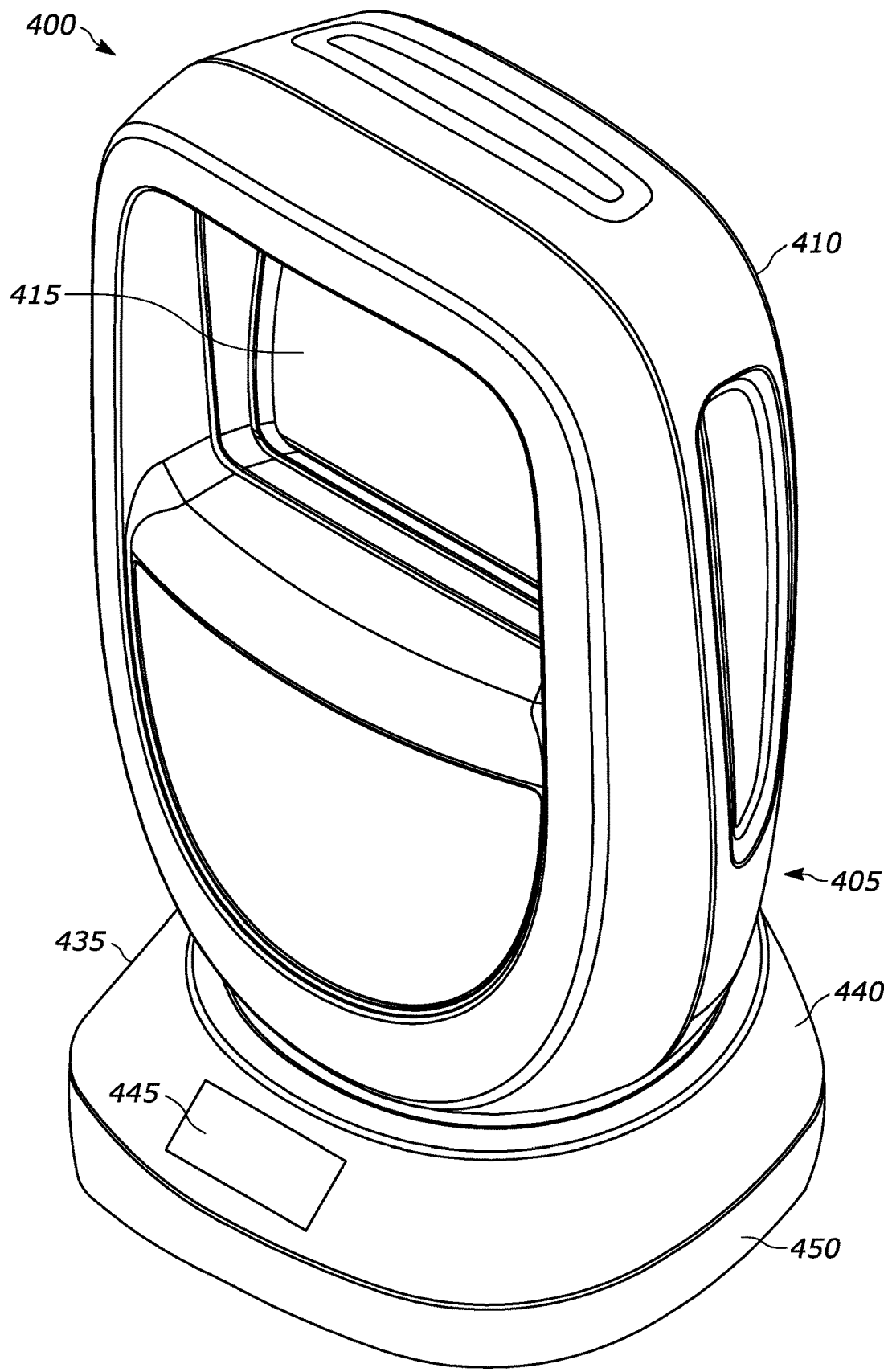
FIG. 4A illustrates a perspective view of a second example handheld barcode reader.
Figure 4B:
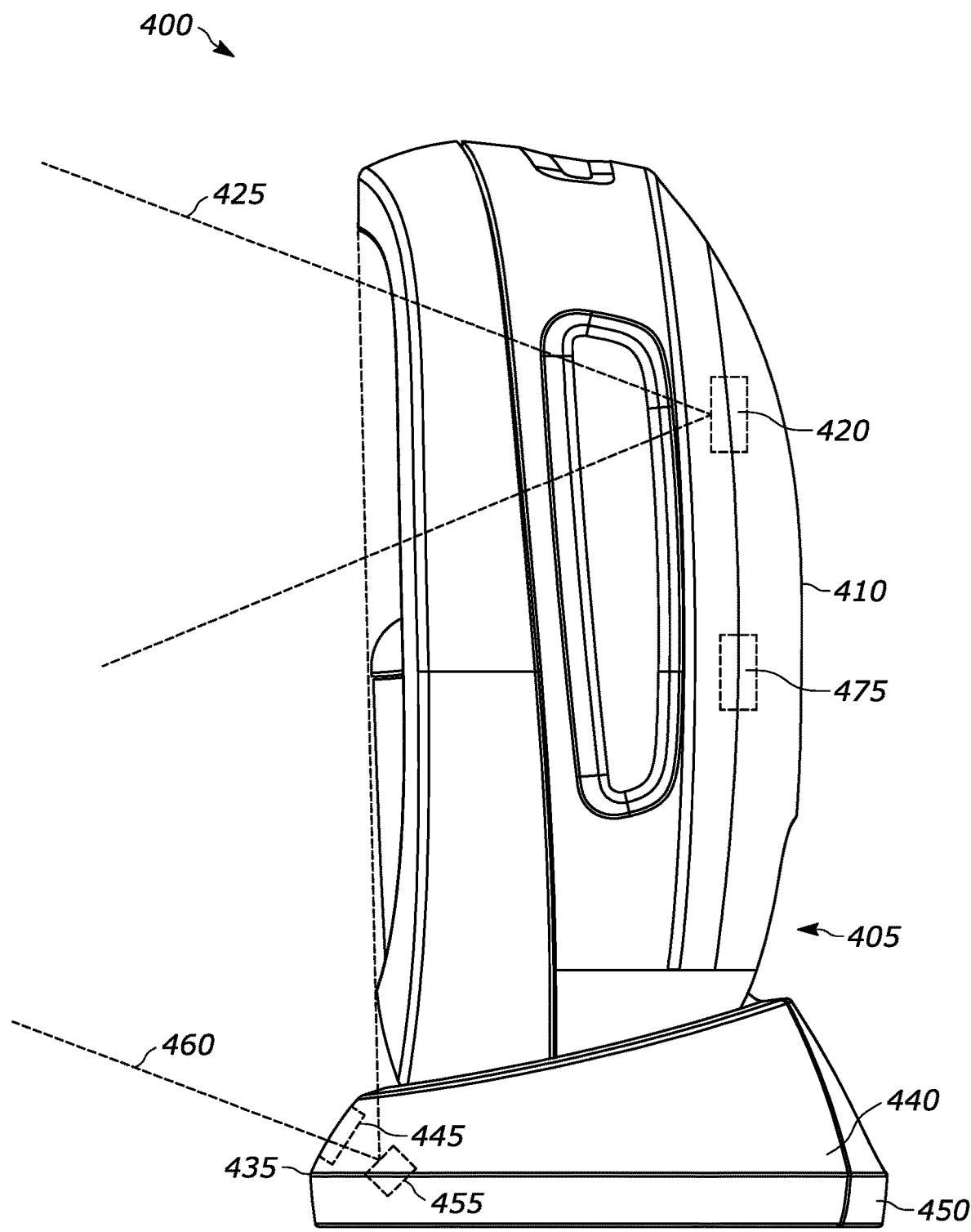
FIG. 4B illustrates a side view of the handheld barcode reader of FIG. 4A.
Figure 4C:
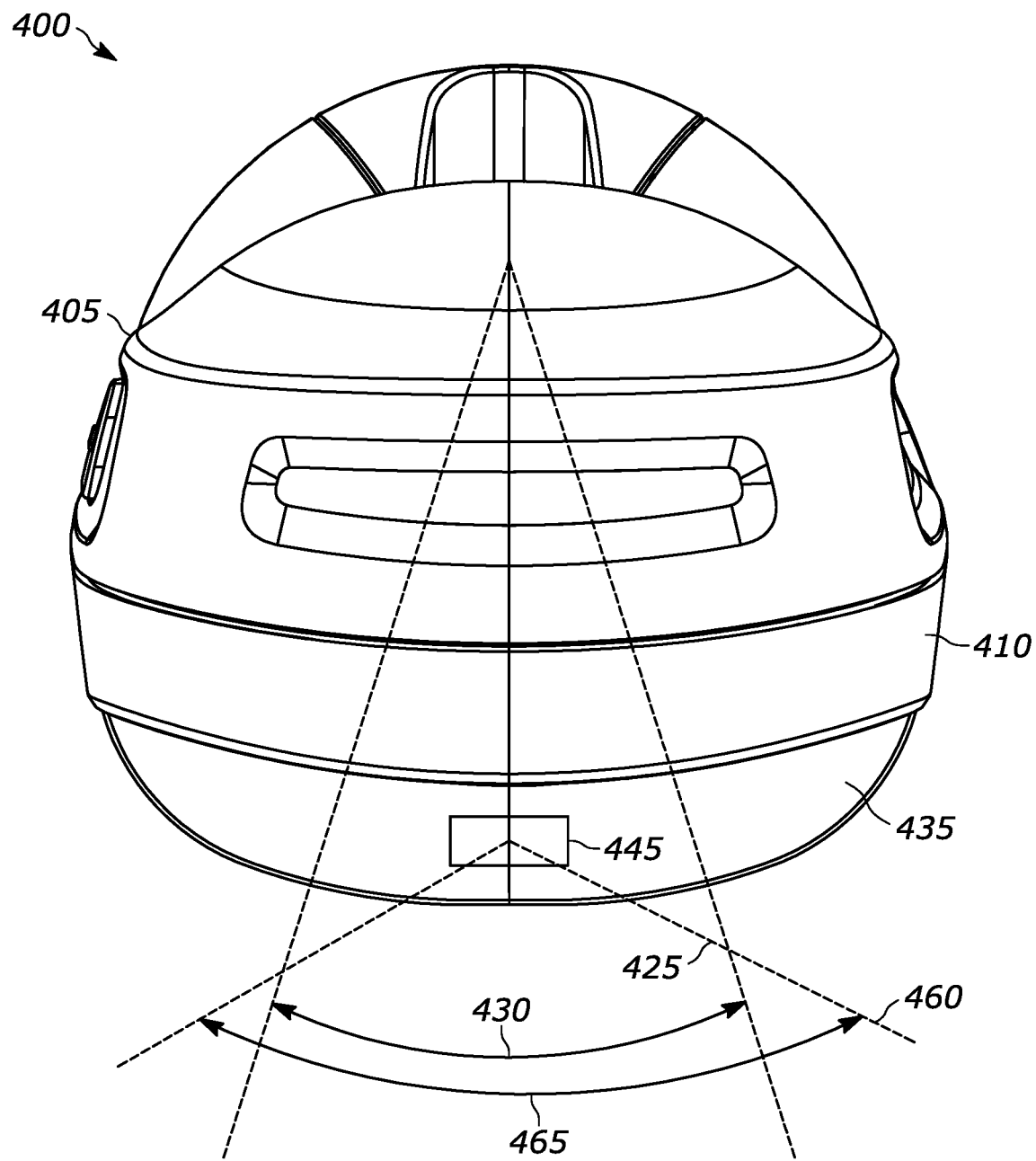
FIG. 4C illustrates a top view of the handheld barcode reader of FIG. 4A.

Referring to FIGS. 4A-4C, a second example handheld barcode reader 400 is illustrated. Handheld barcode reader 400 generally includes a housing 405 having a head portion 410 and a base portion 435. Base portion 435 includes an upper portion 440, a lower portion 450 removably attached to upper portion 440, and a base window 445 formed in upper portion 440. While lower portion 450 is shown as being separable from upper portion 440 in a horizontal direction, the separation between lower portion 450 and upper portion 440 could be vertical or in any other direction appropriate for a particular application.

A color sensor 455 is positioned within base portion 435 and has a first field-of-view (FOV) 460 that is directed out of base window 445 in upper portion 440 of base portion 435. In the example shown, color sensor 455 is configured to capture images to perform functions such as facial recognition, gesture recognition, product identification, scan avoidance, ticket switching, etc., and is not configured to capture images for decoding barcodes.

A barcode reading module 420 is positioned at least partially in head portion 410 and has a second FOV 425 that is directed through an imaging window 415 in head portion 410 and can at least partially overlap first FOV 460. Further, barcode reading module 420 may include shutter circuitry as described above with regard to FIG. 2.

A controller 475 is also positioned within housing 405 and is in communication with barcode reading module 420 and color sensor 455. Controller 475 is configured to decode process signals from barcode reading module 420 from barcodes that are read by barcode reading module 420 and to receive and process images captured by and received from color sensor 455 for processes that do not include barcode reading, as discussed above. Controller 475 is also configured to synchronize barcode reading module 420 and color sensor 455 so that color sensor 455 does not capture images when barcode reading module 420 is active. Controller 475 can synchronize barcode reading module 420 and color sensor 455 based on images captured by color sensor 455 or handheld barcode reader 400 could have an optical sensor 480 that is positioned in base portion 435, is in communication with controller 475, and has a third FOV 485 that at least partially overlaps second FOV 425 of barcode reading module 420 to determine when barcode reading module 420 is active. Controller 475 can then be configured to receive signals from optical sensor 480 indicating whether or not barcode reading module 420 is active and synchronize color sensor 455 and barcode reading module 420 (e.g., by not capturing images from color sensor 455 while barcode reading module 420 is active) based on the signals received from optical sensor 480. Alternatively, controller 475 could be configured to synchronize color sensor 455 and barcode reading module 420 to activate simultaneously so that color sensor 455 can use the same illumination as barcode reading module 420.

As best shown in FIG. 4C, in some implementations, first FOV 460 of color sensor 455 has a horizontal viewing angle 465 that is larger than the horizontal viewing angle 430 of second FOV 425 of barcode reading module 420. For example, horizontal viewing angle 465 of first FOV 460 could be between 80 degrees and 120 degrees and is preferably 100 degrees. In addition, horizontal viewing angle 430 of second FOV 425 could be between 40 degrees and 60 degrees. With horizontal viewing angle 465 of first FOV 460 of color sensor 455 being wider than horizontal viewing angle 430 of second FOV 425 of barcode reading module 420, color sensor 455 can be used as a wake-up system and controller 475 can be configured to turn on barcode reading module 420 when an object is detected in first FOV 460 of color sensor 455, before the object reaches second FOV 425 of barcode reading module 420. This allows barcode reading module 420 to be active as the object enters second FOV 425 and allows more time for barcode reading module 420 to read and decode a barcode on the object.

Although the example embodiments of FIGS. 4B-4C depict the barcode reading module 420 including a monochromatic sensor in the head portion 410 and the color sensor in the base portion 435, it will be understood that, in some implementations, the barcode reading module 420 is located in the base portion 435 and the color sensor 455 is located in the head portion 410. In further implementations, both the barcode reading module 420 and the color sensor 455 are located in either the head portion 410 or the base portion 435.

Although FIGS. 4A-4C depict multiple imaging assemblies, it will be understood that, in some implementations, the barcode reader only includes a single imaging assembly with a single imaging sensor.

Figure 5A:
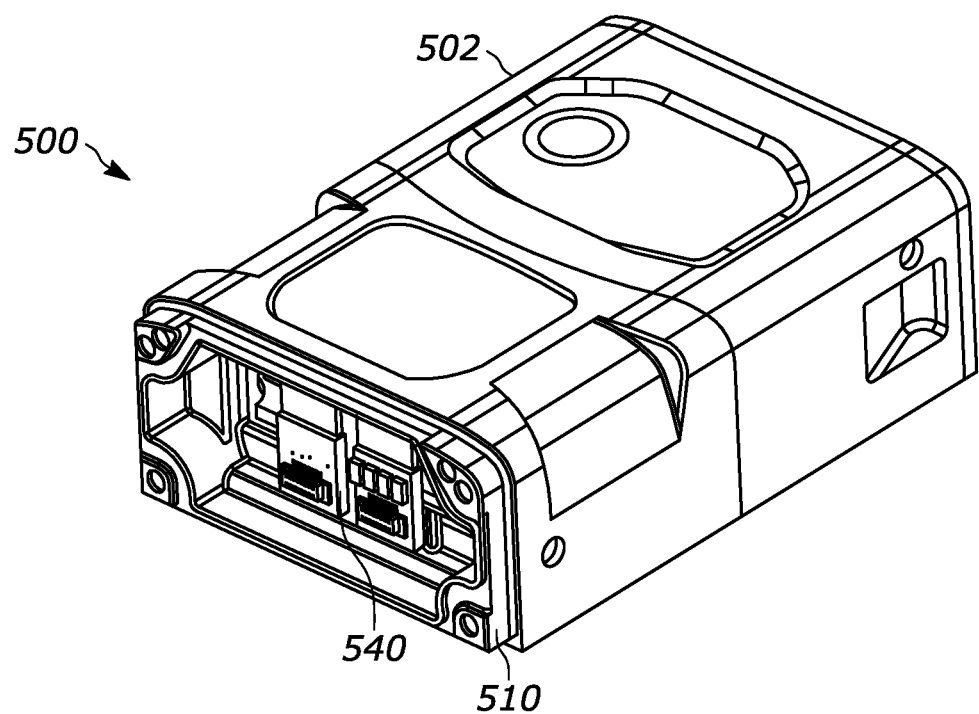
FIG. 5A illustrates a perspective view of an example industrial imager.
Figure 5B:
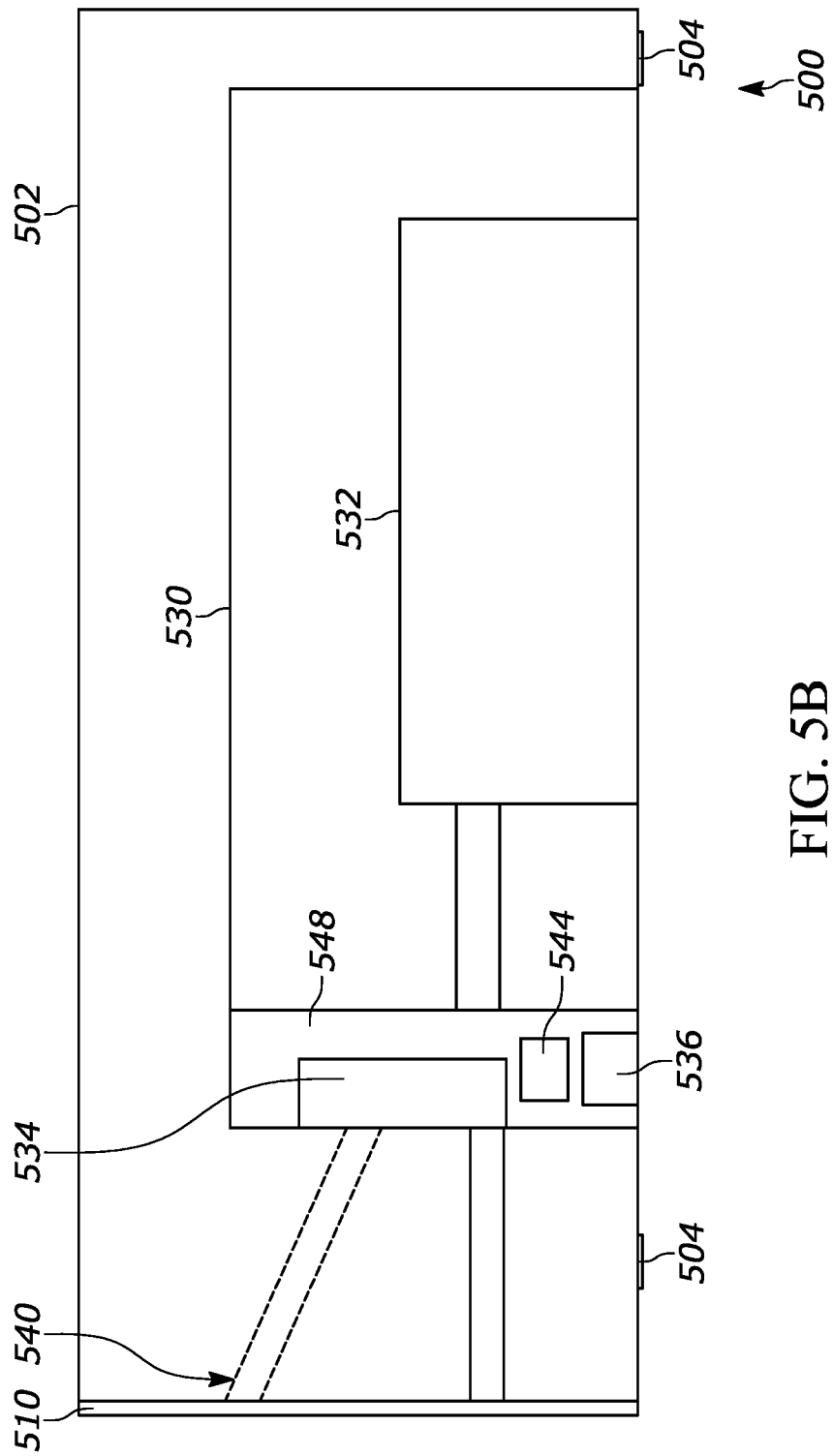
FIG. 5B illustrates a side view of the industrial imager of FIG. 5A.
Figure 5C:
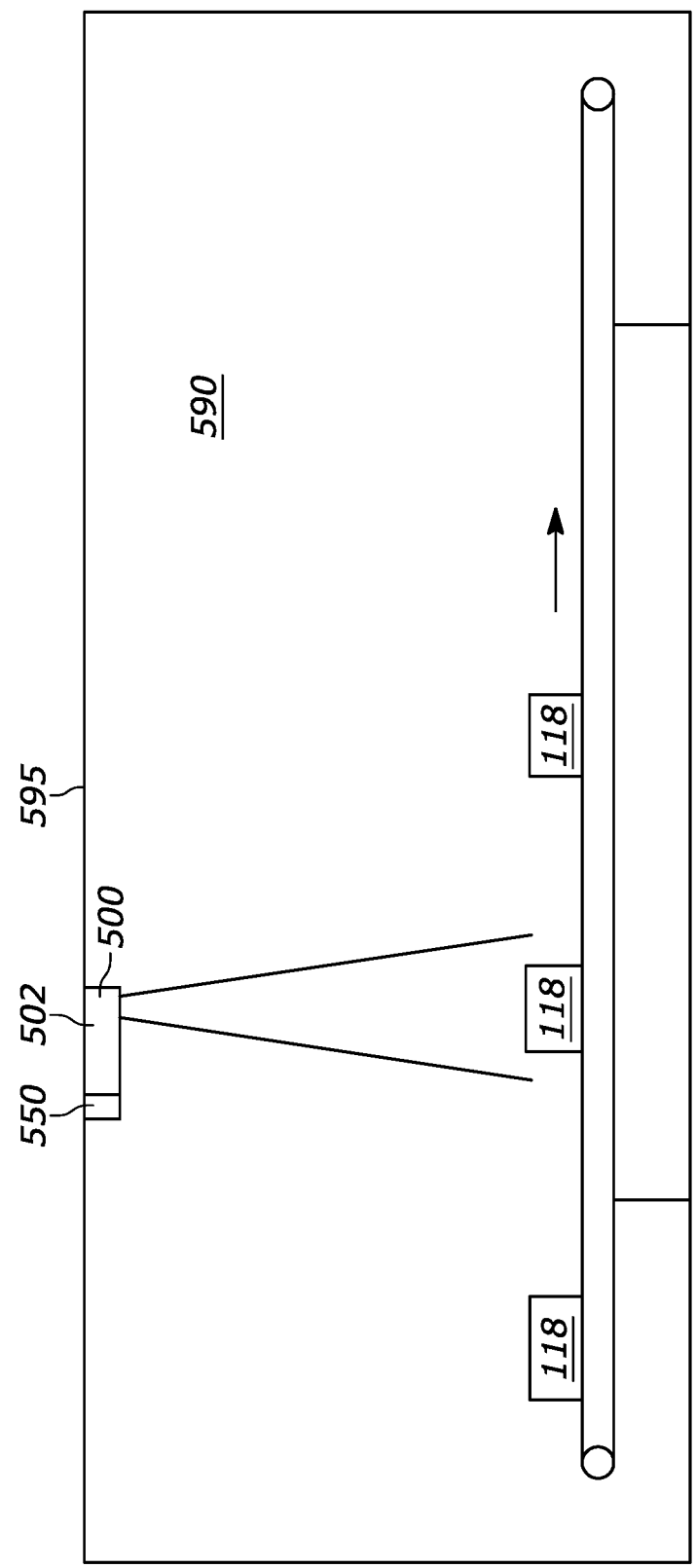
FIG. 5C illustrates an environment for imaging objects using the industrial imager of FIG. 5A.

Turning to FIGS. 5A-5C, a fixed mount industrial imager 500 is provided that includes a housing 502 having any number of mounting mechanisms 504 and a coupling mechanism 510, an image capture assembly 530 at least partially disposed within the housing 502, and an example environment 590 for using the industrial imager 500 to image objects 118. The housing 502 includes an open portion or volume that is dimensioned to accommodate any number of components, subcomponents, systems, and/or subsystems of the imager to capture images of a desired object 118 disposed in the environment 590. The fixed mount industrial imager 500 may additionally include any number of additional components or any other circuitry and circuit boards to assist in operation of the imager 500.

With brief reference to FIG. 5C, the housing 502 may be fixedly coupled with a frame member or other structure 595 provided in an environment 590 such as, for example, an assembly line and/or manufacturing facility via the mounting mechanisms 504. In some examples, the mounting mechanisms 504 may be in the form of threaded openings to receive a bolt or screw. Other examples are possible such as, for example, a magnetic coupling.

The image capture assembly 530 includes an optical assembly 532 having elements for imaging the target object 118 onto an image sensor of the image capture assembly 530. In some implementations, the image capture assembly 530 and/or optical assembly 532 resemble, are, or are part of imaging device 200 as described above with regard to FIG. 2. The image capture assembly 530 further includes a tangible machine-readable medium 534, a decoder engine 536, at least one image capture assembly interface 540, and at least one central processing unit or graphics processing unit 544. In embodiments, the image capture assembly 530, specifically the optical assembly 532, may include one or more aspheric lenses, glass lenses, variable focus lenses, spatial filters, optical filters, apertures, bandpass filters, highpass filters, lowpass filters, notch filters, chromatic filters, neutral density filters, or another type of lens or optical element. In embodiments, the image capture assembly 530 may be configured to correct or mitigate chromatic dispersion, optical field curvature, coma, chromatic aberrations, and/or other optical field distortions. In any embodiments, the image capture assembly 530 is configured to allow for the image of the target object 118 to form correctly on the imaging sensor. Other configurations and/or components may be used.

As previously noted, the image capture assembly 530 may further include an imaging sensor (e.g., imaging sensor 241 of FIG. 2) and a sensor circuit board 548. The imaging sensor is configured to receive an image of the target object 118 and to generate an electrical signal indicative of the image of the target object 118. The sensor circuit board 548 is communicatively coupled with the imaging sensor to control the imaging sensor for obtaining an image of the target object 118. Further, the decoder engine 536, the image capture assembly interface 540, and/or the central processing unit or graphics processing unit 544 may each be operably or communicatively coupled with the sensor circuit board 548. The sensor circuit board 548 may include additional components such as a controller for controlling when to activate the imaging sensor to capture the image (i.e., an image frame) of the target object 118 as well as one or more memories for storing the electrical signal indicative of the captured image, or for storing computer readable instructions for controlling the imaging sensor. The fixed mount industrial imager 500 has an imaging field of view (FOV) for capturing image frames of the target object 118.

The image capture assembly 530 may be capable of performing machine vision analyses. Generally speaking, the tangible machine-readable medium 534 includes instructions that, when executed, cause the image capture assembly 530 to capture at least one image of the target object 118 to determine the presence and/or absence of a specified feature associated with the target object 118 and/or to determine positional accuracy of the target object 118 or features thereon. The image capture assembly 530 may use the central processing unit or graphical processing unit 544 to analyze the images and make appropriate decisions based thereon. For example, if a faulty target object 118 traverses an assembly line and enters the FOV of the imager 500, the imager 500 may determine the target object 118 is faulty and may generate a trigger to alert a user to further assess the target object 118. In other examples, the imager 500 may be capable of automatically flagging the target object 118 for disposal or other processes. Other examples of suitable features are possible.

The image capture assembly interface 540 may include a communications module or input/output (I/O) devices and ports for communicating with external systems, devices, and networks, and may be communicatively and/or operably coupled with the sensor circuit board 548 to allow for power and/or data transmission between the image capture assembly 530, the remainder of the imager 500, and any external systems and/or subsystems such as, for example, displays, computing devices, and the like. Depending on the implementation, the image capture assembly interface 540 is in the form of a number of flex tail connectors, board to board connectors, sockets, conductive pads positioned on the sensor circuit board 548, and/or any other such type of suitable connector.

The coupling mechanism 510 is positioned at an end of the housing 502 and is dimensioned to operably couple with the first field-interchangeable removable connector module 550 (and/or any additional field-interchangeable removable connector modules). In some examples, the coupling mechanism 510 may be in the form of a ledge, a protrusion, or a groove, and in other examples, the coupling mechanism 510 may additionally include notches, snaps, tabs, slots, and/or threaded openings to receive a fastener or fasteners.

Figure 6A:
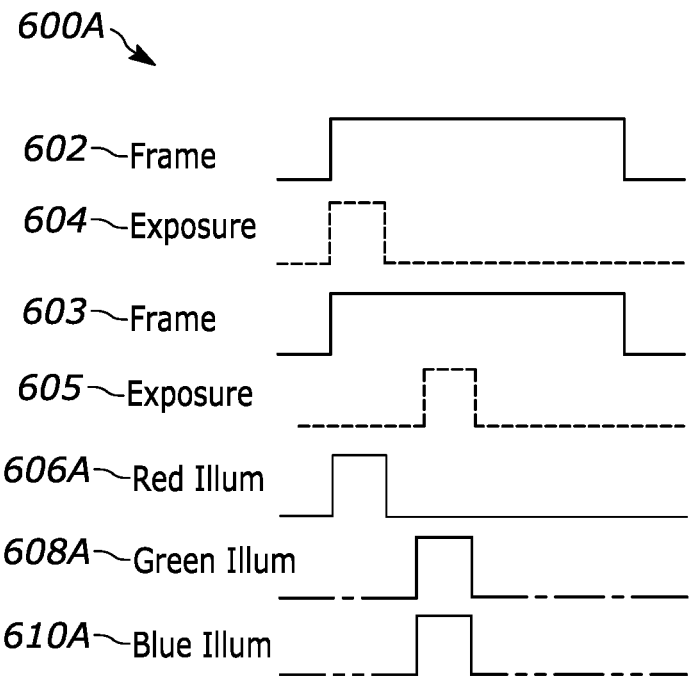
FIGS. 6A-6C illustrate timing diagrams of a sensor receiving light during a frame and from a subset of a plurality of light sources, each of the light sources emitting one of red, green, and blue light.
Figure 6B:
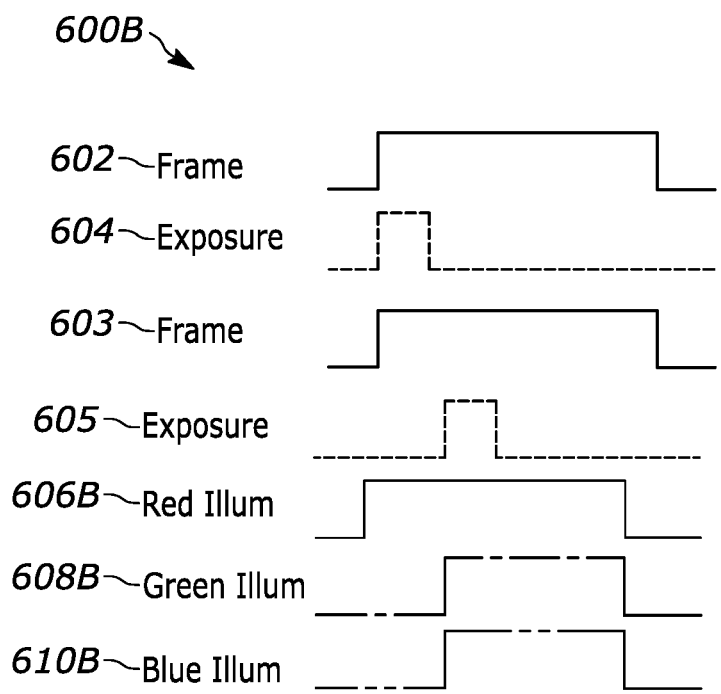
Figure 6C:
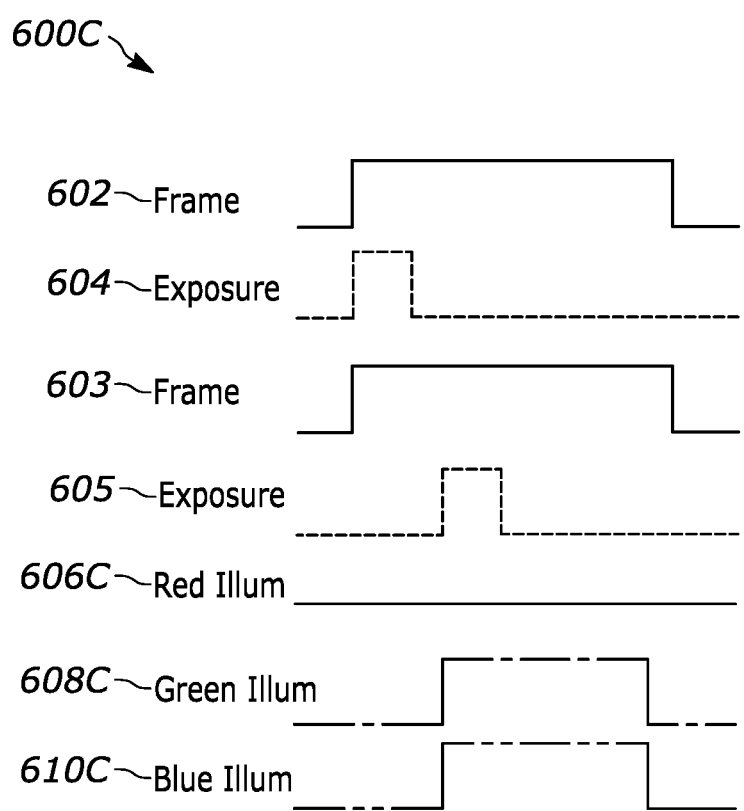

Referring next to FIGS. 6A-6C, the timing diagrams 600A, 600B, and 600C (collectively referred to as timing diagrams 600) illustrate example timings for light pulses from the imaging device 200. Over the course of a frame 602, the imaging device 200 transmits activation pulses to a red illumination assembly, green illumination assembly, and blue illumination assembly, causing each illumination assembly to respectively emit light according to a red illumination pulse 606A-C (collectively referred to as red illumination pulse 606), a green illumination pulse 608A-C (collectively referred to as green illumination pulse 608), and a blue illumination pulse 610A-C (collectively referred to as blue illumination pulse 610). Further, the imaging device 200 exposes a sensor to the light for an exposure duration 604 and/or exposes an additional sensor to the light for an exposure duration 605.

In the example FIG. 6A, the exposure duration 604 occurs simultaneously with the red illumination pulse 606A and before either of the green illumination pulse 608A or blue illumination pulse 610A. As such, the sensor receives the light emitted by the red illumination assembly and reflected by an object 118 rather than the light emitted by the green illumination assembly or blue illumination assembly. However, in some implementations, the red illumination pulse 606A, green illumination pulse 608A, and blue illumination pulse 610A are close enough in time and/or pulsed with a frequency fast enough (e.g., 45 Hz, 50 Hz, 60 Hz, etc.) that an observing human eye registers the visible light as white rather than any of the three individual colors. As such, although the frame 602 in FIG. 6A includes at least two illumination durations (such as the period in which the red illumination pulse 606A occurs and the period in which the green illumination pulse 608A and blue illumination pulse 610A occur), an observing human eye likely only notices a single illumination that appears to be a composite color light, such as white light.

Although FIG. 6A illustrates the red illumination pulse 606A, green illumination pulse 608A, and blue illumination pulse 610A as having equal lengths and brightness, the imaging device 200 can emit light with different brightness and pulse lengths, as seen in FIGS. 6B and 6C. In some implementations, the imaging device 200 emits light with different brightness and proportionally different pulse lengths. For example, in some implementations, the red illumination pulse 606 and the remainder of the light (e.g., the green illumination pulse 608 and blue illumination pulse 610) have the same brightness when the light pulses have the same length. As another example, when the red illumination pulse 606 length is twice as long as the green illumination pulse 608 and blue illumination pulse lengths, the brightness of the red illumination pulse 606 is half as much as the brightness of the remainder of the lights. As such, each light source may operate at a different or similar level of brightness, up to a maximum brightness of each light source. Similarly, depending on the implementation the exposure duration 604 varies. In some implementations, the exposure duration does not overlap with the second illumination duration (e.g., the green illumination pulse 608 and blue illumination pulse 610) so that the sensor is only exposed to a single color illumination pulse (e.g., the red illumination pulse 606).

In FIG. 6B, the red illumination pulse 606B encompasses the same duration as the frame 602, while the green illumination pulse 608B and the blue illumination pulse 610B begin after the exposure duration 604 ends. In FIG. 6C, the red illumination pulse 606C is constantly emitted and the green illumination pulse 608C and the blue illumination pulse 610C begin after the exposure duration 604 ends. In still further implementations, the green illumination pulse 608 and the blue illumination pulse 610 in a second illumination duration is longer than the first illumination duration of the red illumination pulse 606. Although FIGS. 6A-6C display a single set of pulses during frame 602, it will be understood that a frame 602 may include multiple sets of pulses from light sources. In some such implementations, the imaging device 200 repeats the same timing in the frame 602 to verify the accuracy of the first reading. In further implementations, the imaging device 200 alternates the timing in the frame 602, such as to perform an analysis using each color light source. In still further implementations, the frame 602 is a first frame of a series of frames captured in succession. Depending on the implementation, the series of frames may be captured during a predetermined duration and/or a read session activated in response to a trigger, such as a trigger pull on a handheld reader.

In some implementations in which the imaging device 200 includes multiple sensors, such as, for example, a monochrome sensor and a color sensor, the timing diagrams 600 include a second exposure duration 605. It should be appreciated that the second exposure, being associated with a second sensor, is further associated with a second frame 603 of that second sensor. While illustratively the frame 602 of one of the image sensors is shown as perfectly overlapping the second frame 603 of the other image sensor, this does not have to be the case. In other words, what would be considered a start of a frame and an end of a frame do not have to match between the image sensors. Instead, it is simply important that the exposure duration 604 of one of the image sensors does not overlap directly with the exposure duration 605 of the other sensor, and further that different subsets of illumination sources is active during at least some portions of the respective exposure durations.

In some such implementations, the second exposure pulse aligns with the start of the green illumination pulse 608 and the blue illumination pulse 610, and thus the sensor (such as the color sensor) that operates during the second exposure duration 605 receives light from some or all of the LEDs of the imaging device 200. As such, the monochrome sensor in the imaging device 200 receives light according to the red illumination pulse 606 while the color sensor of the imaging device 200 receives light according to multiple illumination pulses.

Figure 7:
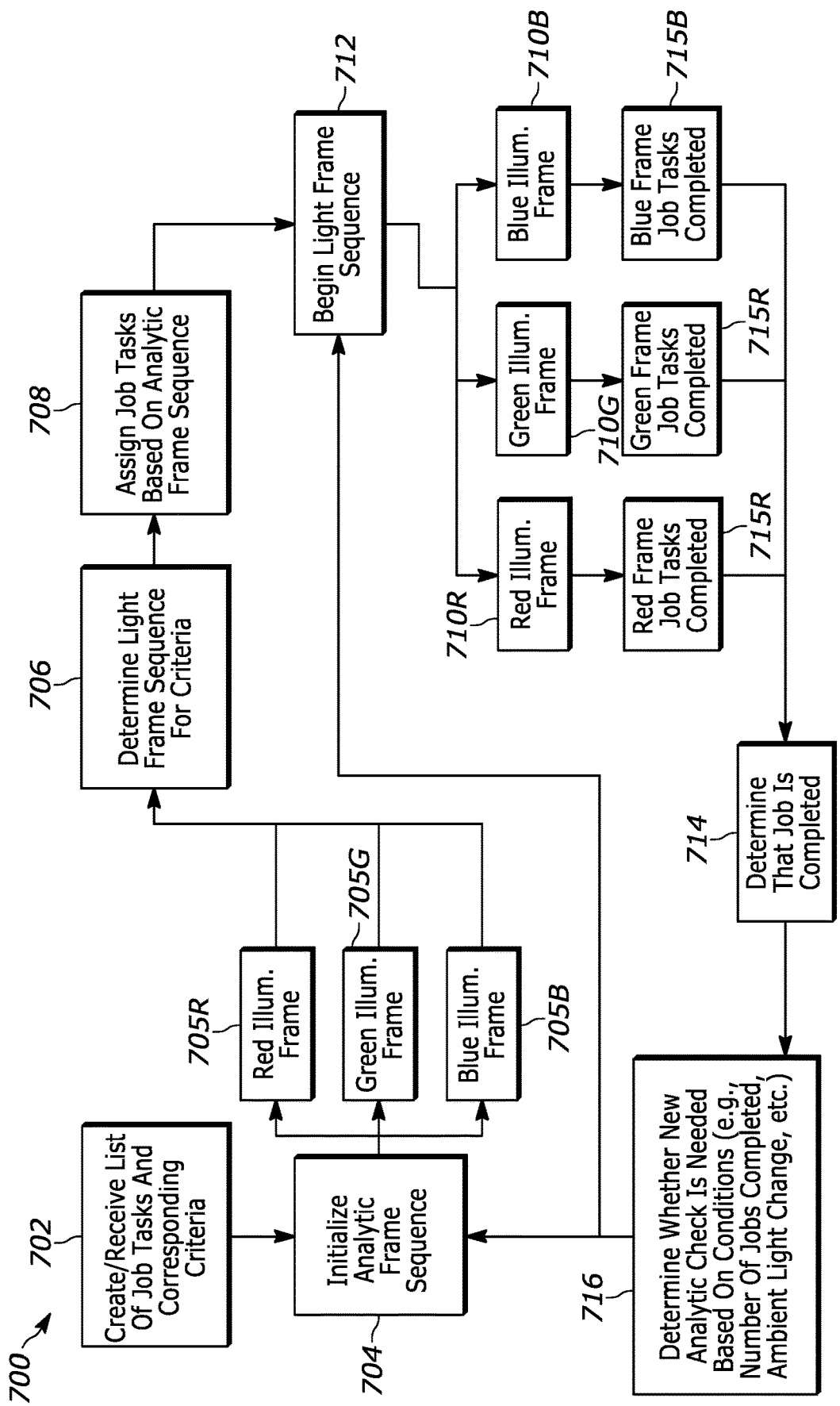
FIG. 7 illustrates a flow diagram of an example method for performing an analysis of image characteristics when imaging an object under multiple colors using an industrial imager of FIGS. 5A-5C.

Referring next to FIG. 7, the method 700 illustrates a flow diagram of an example method for generating, analyzing, and performing a series of job tasks in an industrial imager. Although the method 700 is described below with regard to imaging device 200 and components thereof as illustrated in FIG. 2, it will be understood that other similarly suitable imaging devices and components may be used instead.

At block 702, a list of job tasks is created. In some implementations, the imaging device 200 creates the list of job tasks based on inputs from a user or key characteristics to be analyzed received from a computing device. In other implementations, the imaging device 200 receives the list of job tasks from a computing device. Depending on the implementation, the list of job tasks includes at least one important criteria to measure, such as color contrast (e.g., between the feature and a surrounding portion of the object 118), texture contrast (e.g., between the feature and a surrounding portion of the object 118), sharpness, brightness, presence of specular reflections, intensity of specular reflections, edge detection, corner detection, completeness of OCR sequences, barcode decode speed, direct part marking (DPM) decode speed, and/or any other similar image characteristic.

At block 704, the imaging device 200 initializes an analytic frame sequence to measure the image characteristic(s) for each job task in the list of job tasks. The imaging device 200 emits and receives reflections of a first light from a first light source using a first color while preventing a sensor from registering reflections of the other light sources, as described in more detail below with regard to FIGS. 8 and 9. In the example of method 700, the imaging device 200 performs the analytic frame sequence using each of a red illumination frame 705R, a green illumination frame 705G, and a blue illumination frame 705B. Depending on the implementation, the red illumination frame 705R, green illumination frame 705G, and/or blue illumination frame 705B can be different frames or occur in the same frame. In the red illumination frame 705R, the imaging device 200 performs the analysis with a red light source as the imaging light source 251A. Similarly, the green illumination frame 705G and the blue illumination frame 705B use a green light source and a blue light source, respectively.

At block 706, the imaging device 200 determines which color light source to use for each job task in the list of job tasks. The imaging device 200 further determines a light frame sequence based on the criteria in the list of job tasks. In some implementations, the imaging device 200 determines the light frame sequence based on a metric for analyzing and/or measuring each job task. For example, the metric may be a best value for the job task that the imaging device 200 performs (e.g., highest contrast, highest intensity brightness, most complete image, etc.). In further implementations, the metric includes or is a temporal aspect. For example, the metric may be or may include as a factor the speed at which the imaging device 200 completes the job task.

At block 708, the imaging device 200 assigns job tasks based on the results of the analytic frame sequence. For example, job tasks where the red illumination frame 705R achieves the best metric for determining an image characteristic associated with the job tasks are assigned for the imaging device 200 to capture frames using red illumination (e.g., red illumination frames 710R) in response to the job task. In some implementations, the imaging device 200 assigns a job task to use a color which does not achieve the best metric, so long as the job task metric is within a predetermined percentage of the best metric (e.g., 1%, 5%, 10%, etc.). For example, in a scenario in which the each job task except for one performs best using red illumination, and the remaining job task performs best using green illumination, with the red illumination performance behind by 5%, the imaging device 200 assigns all job tasks to use red illumination to save time and processing power without sacrificing much accuracy. In further implementations, the imaging device 200 determines to perform job tasks in a different order than the list of job tasks based on the determined best illumination (e.g., all red tasks are performed first, all frame tasks are performed second, all blue tasks are performed last, etc.).

At block 712, the light frame sequence begins for the next job, i.e. a job associated with the next object 118 similar to the object 118 used in the analytic frame sequence. The imaging device 200 follows the determined light frame sequence for the list of job tasks, and performs job tasks using red illumination to capture red illumination frames 710R, green illumination to capture green illumination frames 710G, and blue illumination to capture blue illumination frames 710B until each of blocks 715R, 715G, and 715B, where the imaging device determines that the respective red, green, and blue illumination job tasks are completed. In some implementations in which the imaging device 200 does not perform job tasks that capture at least one of the frames 710R, 710G, and/or 710B, the imaging device 200 automatically determines that the corresponding color job tasks are completed. For example, if there are no job tasks in the blue frame, the imaging device 200 automatically determines that all blue job tasks are completed.

At block 714, the imaging device 200 then determines that the job is completed before continuing to block 716. In some implementations, the user sets conditions for a new analytic check. In some such implementations, the imaging device 200 receives or generates the conditions alongside the list of job tasks at block 702. In further implementations, the user sets such conditions after completing a job or after the analytic frame sequence at block 704. After the job is completed, the imaging device 200 determines whether a new analytic check (e.g., block 704) is needed based on conditions, such as a change in ambient light has occurred, a predetermined period of time has passed, a shift change has occurred, a predetermined number of jobs have been completed, a production line speed has changed, an orientation of the object has changed, a subset of a color of the object has changed, and/or any similar such condition. If so, then flow continues to block 704, where the method 700 repeats. If not, then flow continues to block 712, where the flow continues back to block 716.

In some implementations, the imaging device 200 sets the criteria and/or determines that the criteria are fulfilled using a trained machine learning algorithm. In such implementations, the machine learning algorithm is trained to determine when a reanalysis should occur. For example, the imaging device 200 images an object in a location where ambient light changes drastically after 3 hours every day. As such, the trained machine learning algorithm accepts images as inputs and determines a significant change is present in the images after the 3 hour mark. The trained machine learning algorithm determines to add a reanalysis after every 3 hours in response to detecting the change.

At block 716, the imaging device 200 determines whether a new analytic check is needed based on the conditions set at block 702, 704, 716, etc. Depending on the implementation, the conditions include at least one of a change in ambient light has occurred, a predetermined period of time has passed, a shift change has occurred, a predetermined number of jobs have been completed, a production line speed has changed, an orientation of the object has changed, a subset of a color of the object has changed, and/or any similar such condition. For example, depending on the implementation, the imaging device 200 determines to perform a new analytic check after every 3 hours of running. If a new analytic check is not needed, then flow returns to block 712, where the imaging device 200 repeats the light frame sequence for a new object 118. If the imaging device 200 determines that a condition is satisfied and a new analytic check is needed, then flow returns instead to block 704, where the imaging device 200 initializes a new analytic frame sequence and continues on. In some implementations, the imaging device 200 determines that no changes are needed and repeats the light frame sequence using the same information. In other implementations, the imaging device 200 determines appropriate changes using the same techniques as described above.

In some implementations, the imaging device 200 and/or a computing system associated with the imaging device 200 records differences between the new analytic check and the old analytic check. In further implementations, the imaging device 200 and/or a computing system associated with the imaging device 200 saves images of the different analytic check and alerts personnel for manual review of the saved images.

Figure 8:
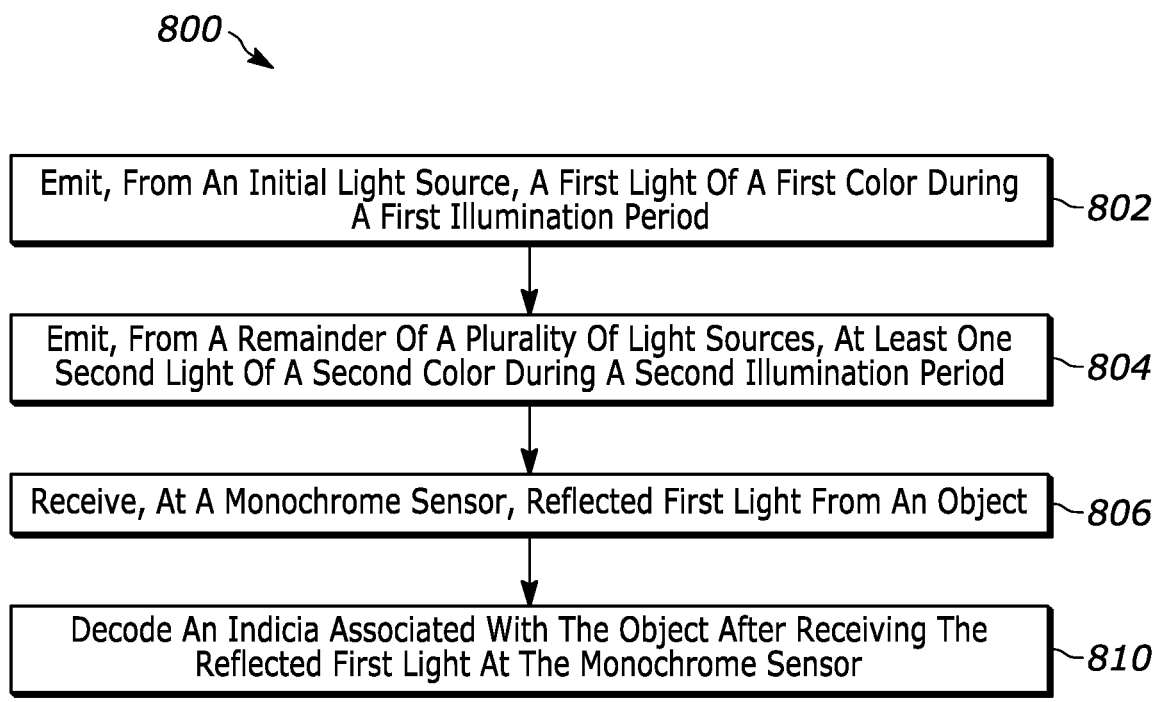
FIG. 8 illustrates a flow diagram of an example method for emitting multiple wavelengths of light and receiving light in only one wavelength range.

Referring next to FIG. 8, the method 800 illustrates a flow diagram of an example method for emitting light of a plurality of colors and registering a single color of light at a monochrome sensor to decode an indicia. Although the method 800 is described below with regard to imaging device 200 and components thereof as illustrated in FIG. 2, it will be understood that other similarly suitable imaging devices and components may be used instead.

At block 802, the imaging device 200 emits a first light of a first color during a first illumination duration. In particular, the imaging device 200 emits the first light from a first subset of the plurality of light sources 251, such as light source 251A. In some implementations, the first light is red light (i.e., light within a wavelength range of 600 nm-720 nm). In other implementations, the first light has a different color (i.e., light outside the wavelength range of 600 nm-720 nm), such as blue (i.e., light within a wavelength range of 450 nm-495 nm) or green (i.e., light within a wavelength range of 520 nm-560 nm). In still further implementations, the first light is infrared (greater than 700 nm). It will be understood that a wavelength and/or emission range may have stray emissions of other non-mentioned light. In such instances, the stray emissions are insubstantial and non-perceivable.

Depending on the implementation, the first illumination duration at least partially overlaps with the exposure duration of a frame as described above with regard to FIGS. 6A-6C. In further implementations, the first illumination duration overlaps with a majority or all of the exposure duration. Depending on the implementation, the first illumination duration may end before or may also overlap at least partially with a second exposure duration for a second sensor.

At block 804, the imaging device 200 emits additional light during a second illumination duration. In particular, the imaging device 200 emits light from a second subset of the plurality of light sources, such as a remainder of the light sources 251B and 251C or such as all of the plurality of light sources 251. In some implementations, the light that the second subset emits and the light from the first subset collectively form a composite color. In some such implementations, the composite color is substantially white. Depending on the implementation, the plurality of light sources may include two light sources, three light sources, or any other similar number of applicable light sources. In some such implementations, the first subset and/or second subset include primary light colors (e.g., RGB). For example, in some implementations where the first subset is red, the second subset includes a blue light source and a green light source. In other such implementations, the first subset and/or the second subset include secondary light colors. For example, in some implementations where the first subset is red, the second subset includes a cyan light source. In further implementations, the plurality of light sources are colors according to YUV values, where a Y component denotes a luminance of the value, a U component denotes a blue projection value, and a V component denotes a red projection value.

Depending on the implementation, an imaging assembly 245 having an imaging sensor operable to receive light from a FOV is configured to capture image data during the frame in which the first subset and second subset emit light. In some implementations, the imaging assembly 245 captures the image data during the frame while the first subset and/or second subset are emitting light or after at least one finishes emitting light.

As described in more detail above with regard to FIGS. 6A-6C, the second illumination duration begins after the first illumination duration begins and, depending on the implementation, may overlap with the first illumination duration. Depending on the implementation, the first illumination duration may at least partially overlap with the exposure duration of a frame and the second illumination duration may at least partially overlap with the non-exposure duration of the frame. In other implementations, the second illumination duration begins after the first illumination duration ends. In further implementations, the first illumination duration and the second illumination duration are approximately the same length (e.g., within 1%, 5%, 10%, or a suitable range of each other). Moreover, in some implementations, the beginning of the first illumination duration and the beginning of the second illumination duration occur close enough that a human eye does not register the first color and only registers the composite color. Depending on the implementation, the pulses may have a rate of 45 Hz, 50 Hz, 60 Hz, etc. (e.g., less than 0.0222, less than 0.02, less than 0.0167 seconds between pulses, respectively). As such, in such implementations, an observing human eye likely does not observe the first color alone, but instead averages the pulses together.

Similarly, in some implementations, the first subset and the second subset emit light with the same brightness when the first illumination duration and the second illumination duration are the same length. In other implementations, the first subset and the second subset emit light with different brightness when the first illumination duration and the second illumination duration are different lengths. As such, when the first illumination duration is longer than the second illumination duration, the brightness of the first subset is proportionally less than the brightness of each of the second subset. For example, when the first illumination duration is twice as long as the second illumination duration, the brightness of the first light source may be half as much as the brightness of the remainder of the light sources. As such, each light source may operate at a different or similar level of brightness, up to a maximum brightness of each light source.

At block 806, the imaging device 200 receives at least some of the first color light back as reflected light from an object, such as object 118. In some implementations, the imaging device 200 receives the reflected light at a monochrome sensor. In some implementations, the monochrome sensor registers a single color of light different from the color of light the human eye registers. For example, the reflected first light may be red light while the combination of the first light and the second light appears as white light to a human eye.

At block 810, the imaging device 200 decodes an indicia associated with the object after receiving the reflected first light at the monochrome sensor. In some implementations, the indicia is a barcode, QR code, a label, etc. In further implementations, the indicia may be or may be part of a digital watermark. For example, the indicia may be a barcode or other indicia that repeats over an object to create a digital watermark that covers at least part of the object.

Depending on the implementation, the imaging device 200 may perform the events of method 800 in response to detecting the indicia or an object. For example, in some such implementations, the imaging device 200 initially emits light from three light sources near simultaneously to emit and receive white light. Upon detecting the presence of an indicia using the monochrome sensor, the imaging device 200 begins performing the method 800 to take advantage of the better resolution by receiving a single color at the monochrome sensor while emitting what appears to be a white light to the human eye. In further implementations, the imaging device 200 performs the events of method 800 in response to detecting the indicia and determining the type of indicia (e.g., barcode, QR code, digital watermark, etc.). As such, the imaging device 200 can perform method 800 for some types of indicia but does not perform method 800 for other types of indicia.

In some implementations, the indicia is an object barcode that identifies the object. In further implementations, the imaging device 200 decodes a parameter barcode to generate parameter barcode data. As such, the imaging device 200 is able to change characteristics about the process based on the parameter barcode. For example, a scenario includes the first subset as a red light source, the second subset including a blue light source and a green light source, and the first illumination duration and the second illumination duration having equal lengths. Reading the parameter barcode changes the second subset of the light sources to be a cyan light source instead of the blue light source or green light source. Similarly, reading a different parameter barcode changes the first illumination duration length and/or the brightness of the first subset of light sources. In further implementations, the imaging device 200 sets the second illumination duration to be approximately zero (i.e., actually zero, a smallest unit of time, etc.), such as in implementations in which the combined color is not needed. Therefore, a user changes parameters of the imaging device 200 without needing to input parameters via a user interface.

Figure 9:
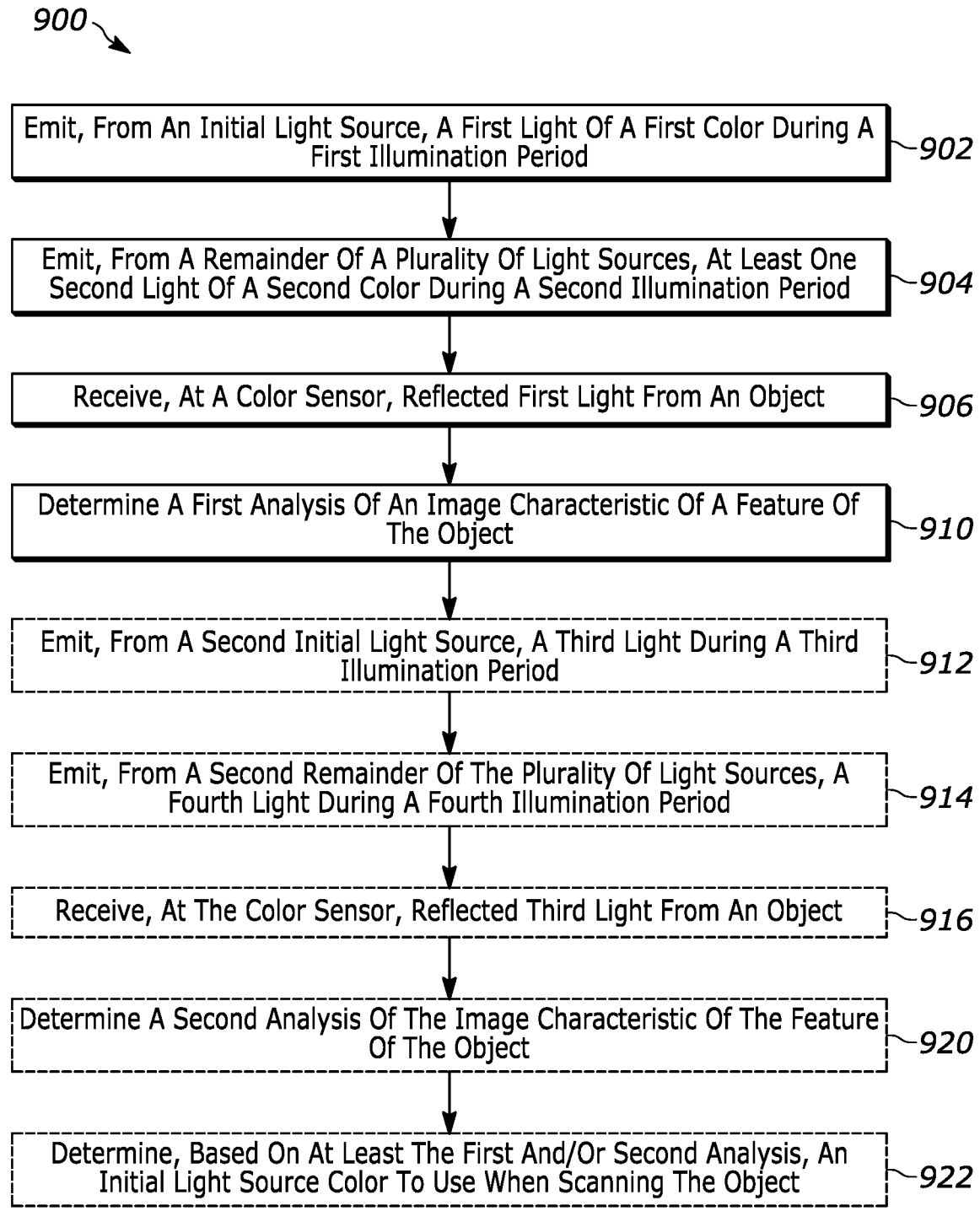
FIG. 9 illustrates a flow diagram of an example method for determining a light source color to use when imaging an object.

Referring next to FIG. 9, the method 900 illustrates a flow diagram of an example method for emitting light of a plurality of colors and receiving a single color of light at a monochrome sensor to decode an indicia. Although the method 900 is described below with regard to imaging device 200 and components thereof as illustrated in FIG. 2, it will be understood that other similarly suitable imaging devices and components may be used instead.

At block 902, the imaging device 200 (i) emits a first light of a first color during a first illumination duration, similar to block 802 as described above with regard to FIG. 8. Similarly, at block 904, the imaging device 200 (ii) emits additional light during a second illumination duration, similar to block 804 as described with regard to FIG. 8. As such, additional embodiments described with regard to at least blocks 802 and 804 apply to blocks 902 and 904, respectively.

At block 906, the imaging device 200 receives at least some of the first color light back as reflected light from an object, such as object 118. In some implementations, the imaging device 200 receives the reflected light at a color sensor. In some implementations, the sensor registers a single color of light different from the color of light the human eye registers. For example, the reflected first light may be red light while the combination of the first light and the second light appears as white light to a human eye.

At block 910, the imaging device 200 determines a first analysis of an image characteristic of a feature of the object 118 from the reflected first light. Depending on the implementation, the imaging device 200 may, prior to performing (i) and (ii) in blocks 902 and 904, capture at least one image with an illumination light source of the plurality of light sources. In such implementations, the imaging device 200 identifies an image characteristic in the image and, based on the image characteristics, performs the analysis to select at least a first light source and a second light source for the plurality of light sources to use in analyzing further objects. Depending on the implementation, the imaging device 200 may additionally capture further images with different light sources to use in analysis.

In some implementations, the feature of the object 118 may be at least one of: a barcode, a screw, a PCB, a PCB component, a label, an etching, a predetermined component of the object, a text marking, an adhesive, and/or any other similar feature of the object 118. Depending on the implementation, the image characteristics is at least one of color contrast (e.g., between the feature and a surrounding portion of the object 118), texture contrast (e.g., between the feature and a surrounding portion of the object 118), sharpness, brightness, presence of specular reflections, intensity of specular reflections, edge detection, corner detection, completeness of OCR sequences, barcode decode speed, direct part marking (DPM) decode speed, and/or any other similar image characteristic.

In some implementations, the imaging device 200 performs blocks 902-910 of method 900 in response to receiving an indication to perform setup for a programmed job. For example, the system receives an indication to perform a series of job tasks for an item on a conveyor belt, such as reading a barcode, looking for the presence of particular screws, looking for a particular part, and looking for the presence of a DPM. The imaging device 200 then performs blocks 902-910 to perform an analysis of a particular color light on the image characteristics noted in the job tasks.

In some implementations, the imaging device 200 determines that the analysis of the particular color light on the image characteristics is above a predetermined threshold for clarity, contrast, sharpness, or some other measurement and completes the method 900 by selecting the color to perform the job tasks. In further implementations, the imaging device 200 performs multiple analyses using additional light sources as described in blocks 912-920 below. For example, the imaging device 200 performs the analyses with red light, blue light, and green light as described with regard to FIG. 7 above. In such implementations, the imaging device 200 determines a light with the greatest contrast, clarity, sharpness, etc. and performs the job tasks for each item on the conveyor according to the analyses.

At blocks 912 and 914, the imaging device 200 performs blocks 902 and 904 again, using a different light source(s) of the plurality of light sources as the first subset of light sources and/or the second subset of light sources to perform (i) and (ii) again. As such, the imaging device emits, from a second imaging light source (e.g., the different light source of the plurality of light sources), a light during a third illumination duration and, using different light source(s) of the plurality of light sources as the second subset of light sources, a light during a fourth illumination duration.

At block 916, the imaging device 200 receives, at the color sensor, the reflected from the second imaging light source. At block 920, the imaging device 200 determines a second analysis of the image characteristic of the feature of the object 118 from the reflected light. In some implementations, the imaging device 200 captures a second image before performing (i) and (ii) again and identifies a second image characteristic as described above with regard to block 910 before performing block 920 to select an updated first and/or second light source. Depending on the implementation, the imaging device 200 performs each of blocks 912, 914, 916, 918, and 920 similarly to blocks 902, 904, 906, 908, and 910, respectively, and embodiments described with regard to such further apply to the respective blocks.

In some implementations, the imaging device 200 performs block 910 before skipping to block 922. In such implementations, the imaging device does not perform the methods as described in blocks 912-920. In further implementations, the imaging device 200 performs each of blocks 910-920 before performing block 922 as described below.

At block 922, the imaging device 200 determines an imaging light source color to use when imaging the object 118. Depending on the implementation, the imaging device 200 makes the determination based on the first analysis and/or the second analysis. In further implementations, the imaging device 200 performs additional iterations of portions of the method 900, as described in more detail below. In such implementations, the imaging device 200 makes the determination based further on any corresponding analyses to the additional iterations.

In some implementations, imaging device 200 performs multiple iterations of emitting light from the first subset of light sources and/or the second subset of light sources to determine imaging light source colors. In such implementations, the imaging device 200 causes the first imaging light source (e.g., the first subset of light sources described in block 902) to emit another light during a fifth illumination duration and the second subset (e.g., those described in block 904) of light sources to emit another light during a sixth illumination duration. The imaging device 200 then determines a third analysis of the image characteristic of a feature of the object. Similarly, in some such implementations, the second imaging light source (e.g., the first subset of light sources described in block 912) emits a light during a seventh illumination duration and a second subset of the plurality of light sources (e.g., those described in block 914) emits light during an eighth illumination duration. The imaging device 200 then determines a fourth analysis of the image characteristic of the feature of the object. Put another way, the imaging device repeats the method 900 to determine what light source(s) to use in performing analysis of objects. Based on at least the third analysis and the fourth analysis, the imaging device 200 determines a second imaging light source color to use.

In some implementations, the first imaging light source color and the second imaging light source color are the same color. In other implementations, the imaging device 200 determines that the second imaging light source color and the first imaging light source color are different based on the ambient light. Put another way the imaging device 200 may determine that a different color better analyzes the image characteristic in a different ambient light, such as artificial light, natural daylight, total darkness, dim light, etc. In further implementations, the imaging device 200 determines the first imaging light source color for a first job task and determines the second imaging light source color for a second job task. For example, in a scenario, the first job task may be to determine the color contrast between a screw and the surrounding area and the second job task may be to determine a decode speed of a barcode. The imaging device 200 may determine that a blue light source is best to perform the color contrast determination, but a red light source is best to determine the decode speed of the barcode. The imaging device 200 may then perform the job tasks using the determined color for each object 118.

In some implementations, the imaging device 200 determines that the first imaging light source has a first color when a metric of the first analysis surpasses a metric of the second analysis, and a second color when a metric of the second analysis surpasses a metric of the first analysis. In has the first color when a metric of the third analysis surpasses a corresponding metric of the fourth analysis and the second imaging light source has a second color when a metric of the fourth analysis surpasses a corresponding metric of the third analysis. In further implementations, the second imaging light source color is the first color when, alternatively, the first imaging light source color is the first color and the metric of the fourth analysis is within a predetermined percentage of the metric for the third analysis (e.g., 1%, 5%, 10%, etc.). Similarly, in further implementations, the second imaging light source color is the second color when the first imaging light source color is the second color and the metric of the third analysis is within a predetermined percentage of the metric for the fourth analysis (e.g., 1%, 5%, 10%, etc.). Put another way, when determining what color to use to analyze objects 118, the imaging device 200 may determine to continue to use the same color if little or no benefit would be gained by switching, as described above with regard to FIG. 7.

In further implementations, the imaging device 200 performs the additional iterations in response to determining at least one of: a change in ambient light has occurred, a predetermined period of time has passed, a shift change has occurred, a predetermined number of jobs have been completed, a production line speed has changed, an orientation of the object has changed, a subset of a color of the object has changed, and/or any similar such indication. In further implementations, the imaging device 200 makes such a determination using a trained machine learning algorithm.

Although the imaging device 200 is described herein as determining which light source to use for two jobs, it will be understood that the imaging device 200 may make such a determination for any number of jobs. Similarly, while the imaging device 200 is described in FIG. 9 as performing a first and second analysis, it will be understood that any number of analyses may be performed for any number of light sources. For example, in some implementations, the imaging device 200 causes a third light source to additional light to for the analysis. The imaging device 200 then determines an analysis of the image characteristic of the feature of the object 118 using the third light source and determines the imaging light source color to use based on the three analyses.

The instant systems and techniques as described herein provide a number of advantages and benefits compared to standard systems and techniques. As described above, the instant techniques allow for the use of an appropriate light for a given application while appearing to be substantially white light to a human observer, thus avoiding negative side effects associated with particular light colors such as red light. Moreover, the instant techniques allow the systems to provide the appropriate light to multiple imagers as needed, as also described herein. Further, in some embodiments, the instant techniques provide the benefits as noted above while avoiding flickering of light to a human eye, instead maintaining a largely consistent coloration to the human eye.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A device for imaging-based indicia decoding and/or machine vision applications, the device comprising:
    a plurality of light sources, each light source of the plurality of light sources configured to emit light in a different wavelength range;
    an imaging assembly having an imaging sensor operable to receive light from a field of view (FOV), the imaging sensor configured to capture image data during a frame having an exposure duration and a non-exposure duration; and
    a microprocessor and computer-readable media storing machine readable instructions that, when executed, cause:
        (i) a first subset of the plurality of light sources to emit a first light during a first illumination duration that at least partially overlaps with the exposure duration of the frame;
        (ii) a second subset of the plurality of light sources to emit a second light during a second illumination duration that at least partially overlaps with the non-exposure duration of the frame;
        prior to performing (i) and (ii), capture at least one image with at least one illumination light source of the plurality of light sources;
        identify an image characteristic associated with an object in the at least one image; and
        based on the image characteristic, select at least a first light source of the first subset of the plurality of light sources and a second light source of the second subset of the plurality of light sources.

2. The device of claim 1, wherein:
    the imaging sensor is a monochrome sensor, and
    the second light has a substantially white color.

3. The device of claim 2, wherein the machine readable instructions, when executed, further cause the device to:
    decode, after receiving the first light, at least one barcode of the object.

4. The device of claim 2, wherein:
    the first subset of the plurality of light sources emits the first light with wavelengths in the range of 600-720 nm, and
    the second subset of the plurality of light sources emits the second light including light with wavelengths in the range of 450-495 nm and light with wavelengths in the range of 520-560 nm.

5. The device of claim 2, wherein the first subset of the plurality of light sources emits the first light with wavelengths in the range of 600-720 nm, and
    the second subset of the plurality of light sources emits the second light with wavelengths in the range of 490-520 nm.

6. The device of claim 2, wherein a first brightness of the first subset of the plurality of light sources is approximately equal to a second brightness of the second subset of the plurality of light sources when a first length of the first illumination duration is approximately equal to a second length of the second illumination duration.

7. The device of claim 2, wherein a first brightness of the first subset of the plurality of light sources is proportionally less than a second brightness of the second subset of the plurality of light sources when a first length of the first illumination duration is longer than a second length of the second illumination duration.

8. The device of claim 2, wherein the machine readable instructions, when executed, further cause the microprocessor to:
    execute (i) and (ii) in response to detecting a presence of a digital watermark in the image data.

9. The device of claim 1, wherein the at least one image includes a first image of the at least one image captured with a first illumination light source and a second image of the at least one image captured with a second illumination light source.

10. The device of claim 1, wherein the image data is captured during or after performing (i) and (ii) a first time, and the machine readable instructions, when executed, further cause the microprocessor to:
    subsequently to capturing the image data, analyze the image data to generate an analysis of the image data;
    capture a second image with the at least one illumination light source of the plurality of light sources;
    subsequently to capturing the second image, perform (i) and (ii) a second time based on the analysis of the image data;
    identify a second image characteristic associated with a second object in the second image; and
    based on the second image characteristic, select at least an updated first light source of the first subset of the plurality of light sources and at least an updated second light source of the second subset of the plurality of light sources.

11. The device of claim 10, wherein the performing (i) and (ii) the first time is in a first ambient light, and the performing (i) and (ii) the second time is in a second ambient light.

12. The device of claim 10, wherein the performing (i) and (ii) the first time is for a first job task of a set of job tasks, the performing (i) and (ii) the second time is for a second job task of the set of job tasks, and the machine readable instructions, when executed, further cause the microprocessor to:
determine, based on at least the first light source and the updated first light source, a job task sequence for performing the set of job tasks.

13. The device of claim 10, wherein the performing (i) and (ii) the second time occurs after the microprocessor determines that at least one of: (a) a change in ambient light has occurred, (b) a predetermined duration of time has passed, (c) a shift change has occurred, or (d) a predetermined number of jobs have been completed.

14. The device of claim 10, wherein the microprocessor determines, using a trained machine learning algorithm, that at least one of: (a) a change in ambient light has occurred, (b) a predetermined duration of time has passed, (c) a shift change has occurred, (d) a predetermined number of jobs have been completed, (e) a production line speed has changed, (f) an orientation of the object has changed, or (g) a subset of a color of the object has changed.

15. The device of claim 10, wherein:
selecting at least the first light source and the second light source includes selecting a third light source of the second subset of the plurality of light sources;
the plurality of light sources includes a red light source that emits light with wavelengths of 600-720 nm, a green light source that emits light with wavelengths of 520-560 nm, and a blue light source that emits light with wavelengths of 450-495 nm;
the first light source is the red light source;
the second light source is the green light source; and
the third light source is the blue light source.

16. The device of claim 1, wherein the second illumination duration is greater than the first illumination duration.

17. The device of claim 1, wherein at least one light source of the plurality of light sources has a brightness value below a maximum brightness value for the at least one light source.

18. The device of claim 1, wherein the first illumination duration overlaps a majority of the exposure duration and the second illumination duration overlaps a majority of the non-exposure duration.

19. A system for imaging-based indicia decoding and/or machine vision applications, the system comprising:
a plurality of light sources, each light source of the plurality of light sources configured to emit light in a different wavelength range; and
an imaging device including:
an imaging assembly having an imaging sensor operable to receive light from a field of view (FOV), the imaging sensor configured to capture image data during a frame having an exposure duration and a non-exposure duration; and
a microprocessor and computer-readable media storing machine readable instructions that, when executed, cause:
(i) a first subset of the plurality of light sources to emit a first light during a first illumination duration that at least partially overlaps with the exposure duration of the frame;
(ii) a second subset of the plurality of light sources to emit a second light during a second illumination duration that at least partially overlaps with the non-exposure duration of the frame;
prior to performing (i) and (ii), capture at least one image with at least one illumination light source of the plurality of light sources;
identify an image characteristic associated with an object in the at least one image; and
based on the image characteristic, select at least a first light source of the first subset of the plurality of light sources and a second light source of the second subset of the plurality of light sources.

20. The system of claim 19, wherein:
the first subset of the plurality of light sources emits the first light with wavelengths in the range of 600-720 nm, and
the second subset of the plurality of light sources emits the second light including light with wavelengths in the range of 450-495 nm and light with wavelengths in the range of 520-560 nm.

21. The system of claim 19, wherein:
the first subset of the plurality of light sources emits the first light with wavelengths in the range of 600-720 nm, and
the second subset of the plurality of light sources emits the second light with wavelengths in the range of 490-520 nm.

22. The system of claim 19, wherein the at least one image includes a first image of the at least one image captured with a first illumination light source and a second image of the at least one image captured with a second illumination light source.

23. The system of claim 19, wherein the image data is captured during or after performing (i) and (ii) a first time, and the machine readable instructions, when executed, further cause the microprocessor to:
subsequently to capturing the image data, analyze the image data to generate an analysis of the image data;
capture a second image with the at least one illumination light source of the plurality of light sources;
subsequently to capturing the second image, perform (i) and (ii) a second time based on the analysis of the image data;
identify a second image characteristic associated with a second object in the second image; and
based on the second image characteristic, select at least an updated first light source of the first subset of the plurality of light sources and at least an updated second light source of the second subset of the plurality of light sources.

24. A method for decoding imaging-based indicia and/or performing machine vision applications, the method comprising:
(i) capturing, by an imaging sensor operable to receive light from a field of view (FOV), image data during a frame having an exposure duration and a non-exposure duration;
(ii) emitting, from a first subset of a plurality of light sources, a first light during a first illumination duration that at least partially overlaps with the exposure duration of the frame, wherein each light source of the plurality of light sources is configured to emit light in a different wavelength range;
(iii) emitting, from a second subset of the plurality of light sources, a second light during a second illumination duration that at least partially overlaps with the non-exposure duration of the frame;
prior to performing (ii) and (iii), capturing at least one image with at least one illumination light source of the plurality of light sources;
identifying an image characteristic associated with an object in the at least one image; and
based on the image characteristic, selecting at least a first light source of the first subset of the plurality of light sources and a second light source of the second subset of the plurality of light sources.

25. The method of claim 24, wherein:
emitting the first light includes emitting light with wavelengths in the range of 600-720 nm, and
emitting the second light includes emitting light with wavelengths in the range of 450-495 nm and light with wavelengths in the range of 520-560 nm.

26. The method of claim 24, wherein:
emitting the first light includes emitting light with wavelengths in the range of 600-720 nm, and
emitting the second light includes emitting light with wavelengths in the range of 490-520 nm.

27. The method of claim 24, wherein the at least one image includes a first image of the at least one image captured with a first illumination light source and a second image of the at least one image captured with a second illumination light source.

28. The method of claim 24, further comprising:
subsequently to capturing the image data, analyzing the image data to generate an analysis of the image data;
capturing a second image with the at least one illumination light source of the plurality of light sources;
subsequently to capturing the second image, performing (ii) and (iii) a second time based on the analysis of the image data;
identifying a second image characteristic associated with a second object in the second image; and
based on the second image characteristic, selecting at least an updated first light source of the first subset of the plurality of light sources and at least an updated second light source of the second subset of the plurality of light sources.

* * * * *